(12) United States Patent
Matni et al.

(10) Patent No.: US 10,320,610 B2
(45) Date of Patent: Jun. 11, 2019

(54) DATA NETWORK CONTROLLED AND OPTIMIZED USING LAYERED ARCHITECTURES

(71) Applicant: California Institute of Technology, Pasadena, CA (US)

(72) Inventors: Nikolai Matni, Pasadena, CA (US); John Comstock Doyle, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 148 days.

(21) Appl. No.: 15/295,507

(22) Filed: Oct. 17, 2016

(65) Prior Publication Data

US 2017/0111223 A1    Apr. 20, 2017

Related U.S. Application Data

(60) Provisional application No. 62/242,853, filed on Oct. 16, 2015, provisional application No. 62/242,836, (Continued)

(51) Int. Cl.
*H04W 40/00* (2009.01)
*H04L 12/24* (2006.01)
(Continued)

(52) U.S. Cl.
CPC ........ *H04L 41/0823* (2013.01); *H04L 41/147* (2013.01); *H04L 45/42* (2013.01);
(Continued)

(58) Field of Classification Search
CPC ....... H04L 47/125; H04L 47/22; H04L 49/25; H04L 49/552; H04W 40/00; H04N 1/00612

See application file for complete search history.

(56) References Cited

U.S. PATENT DOCUMENTS

| 2002/0097680 A1* | 7/2002 | Liu | ...................... H04Q 3/0079 370/238 |
| 2005/0213585 A1* | 9/2005 | Sturm | ..................... H04L 12/56 370/395.31 |

(Continued)

OTHER PUBLICATIONS

Alizadeh et al., "CONGA: Distributed Congestion-Aware Load Balancing for Datacenters", SIGCOMM Comput. Commun. Rev, Aug. 2014, vol. 44, No. 4, 12 pgs.
(Continued)

*Primary Examiner* — Salvador E Rivas
(74) *Attorney, Agent, or Firm* — KPPB LLP

(57) ABSTRACT

Data network components and frameworks for the control and optimization of network traffic using layered architectures, according to embodiments of the invention, are disclosed. In one embodiment, a data network comprises a switch, a data link, a tracking processor, and a planning processor. The planning processor is configured to generate a reference trajectory by receiving a local system state from the tracking processor, calculating a reference trajectory by solving a planning problem, and sending the reference trajectory to the tracking processor. The tracking processor is configured to track the reference trajectory by determining a set of states of the switch over a time interval, sending a local system state to the planning processor, receiving the reference trajectory from the planning processor, computing a control action by solving a tracking problem based on the reference trajectory, determining an instruction based on the control action, and sending the instruction to the switch.

16 Claims, 16 Drawing Sheets

Related U.S. Application Data filed on Oct. 16, 2015, provisional application No. 62/243,398, filed on Oct. 19, 2015.

(51) Int. Cl.
*H04L 12/717* (2013.01)
*H04L 12/939* (2013.01)
*H04L 12/26* (2006.01)
*H04L 12/947* (2013.01)

(52) U.S. Cl.
CPC ........... *H04L 49/552* (2013.01); *H04W 40/00* (2013.01); *H04L 43/0876* (2013.01); *H04L 49/25* (2013.01)

(56) References Cited

U.S. PATENT DOCUMENTS

| | | | | |
|---|---|---|---|---|
| 2012/0317398 | A1* | 12/2012 | Boden | H04L 47/10 712/30 |
| 2013/0107728 | A1* | 5/2013 | Zhu | G01S 5/0278 370/252 |
| 2013/0218365 | A1* | 8/2013 | Caveney | G05D 1/0295 701/1 |
| 2016/0065656 | A1* | 3/2016 | Patin | H04L 67/10 709/201 |

OTHER PUBLICATIONS

Bamieh et al., "Distributed Control of Spatially Invariant Systems", IEEE Transactions on Automatic Control, Jul. 2002, vol. 47, No. 7, pp. 1091-1107.
Boyd et al., "Distributed Optimization and Statistical Learning via the Alternating Direction Method of Multipliers", Foundations and Trends in Machine Learning, vol. 3, No. 1, 2010, 125 pgs.
Cai et al., "Distributed optimization decomposition for joint economic dispatch frequency regulation", IEEE Conference on Decision and Control (CDC), Dec. 2015, 8 pgs.
Chiang et al., "Layering as optimization decomposition: A mathematical theory of network architectures", Proc. of the IEEE, Jan. 2007, vol. 95, No. 1, 78 pgs.
Christofides et al., "Distributed Model Predictive Control: A tutorial review and future research directions", Computer and Chemical Engineering, 2013, vol. 51, available online Jun. 5, 2012, pp. 21-41.
Doyle et al., "Architecture, constraints, and behavior", PNAS, Sep. 13, 2011, vol. 108, Suppl. 3, pp. 15624-15630.
El-Samad et al., "Surviving heat shock: Control strategies for robustness and performance", PNAS, Feb. 22, 2004, vol. 102, No. 8, pp. 2736-2741.
Ho et al, "Team decision theory and Information structures in optimal control problems—part I", IEEE Transactions on Automatic Control. 1972, vol. 17, No. 1, pp. 15-22.
Hong et al., "Achieving High Utilization with Software-Driven WAN", Proceedings of the ACM SIGCOMM 2013, Aug. 2013, vol. 43, No. 4, pp. 15-26.
Jain et al., "B4: Experience with Globally-Deployed Software Defined Wan", SIGCOMM Comput. Commun. Rev., Aug. 2013, vol. 43, No. 4, 12 pgs.
Kelly et al., "Fluid Model for a Network Operating Under a Fair Bandwidth-Sharing Policy", The Annals of Applied Probability, 2004, vol. 14, No. 3, pp. 1055-1083.
Lamperski et al., "Dynamic Programming Solutions for Decentralized State-Feedback LQG Problems with Communication Delays", in American Control Conference (ACC), Jun. 2012, 6 pgs.
Lamperski et al., "Optimal State-Feedback Control Under Sparsity and Delay Constraints", 3rd IFAC Workshop on Distributed Estimation and Control in Networked Systems, 2012, 7 pgs.
Lamperski et al., "The H2 Control Problem for Quadratically Invariant Systems with Delays", IEEE Transactions on Automatic Control, Jul. 2015, vol. 60, No. 7, 7 pgs.
Lessard, "State-space solution to a minimum-entropy H∞-optimal control problem with a nested information constraint", IEEE 53rd Annual Conference on Dec. And Control, Dec. 2014, 6 pgs.
Lessard et al., "Analysis and Design of Optimization Algorithms via Integral Quadratic Constraints", arXiv:1408:3595, Oct. 28, 2015, pp. 1-40.
Mahajan et al., "Information Structures in Optimal Decentralized Control", Decision and Control (CDC), IEEE 51st Annual Conference , Dec. 2012, pp. 1291-1306.
Matni, "Communication Delay Co-Design in H2 Distributed Control Using Atomic Norm Minimization", IEEE Transactions on Control of Network Systems, Oct. 2015, 24 pgs.
Matni, "Distributed control subject to delays satisfying an H∞ norm bound", IEEE 53rd Annual Conference on Decision and Control (CDC), Dec. 2014, 9 pgs.
Matni et al., "A case study in network architecture tradeoffs", Proceedings of the 1st ACM SIGCOMM Symposium on Software Defined networking Research, 2015, 7 pgs.
Matni et al., "A Theory of Dynamics, Control and Optimization in Layered Architectures", Retrieved from: http://www.cds.caltech.edu/~nmatni/home/acc16_LAO-extended.pdf, To Appear in American Control Conference (ACC), 2016, Conference Jul. 6-8, 2016, Boston, MA, USA, 18 pgs.
Matni et al., "Optimal Two Player LQR State Feedback with Varying Delay", in IFAC, Mar. 2014, arXiv: 1403.7790, 9 pgs.
Matni et al., "Regularization for Design", IEEE Transactions on Automatic Control, Oct. 2015, 36 pgs.
Matni et al., "Technical Note: Incorporating dynamics, control, optimization and virtual models into a recursive layered architecture", Oct. 18, 2015, 4 pgs.
Michael et al., "HALO: Hop-by-Hop Adaptive Link-State Optimal Routing", IEEE Transactions on Networking, Sep. 2014, vol. PP, pp. 1-14.
Morari et al., "Model predictive control: past, present and future", Computers and Chemical Engineering, 1999, vol. 23, pp. 667-682.
Motee et al., "Sparsity and Spatial Localization Measures for Spatially Distributed Systems", in American Control Conference (ACC), Jun. 2014, arXif: 1402.4148, 44 pgs.
Nakahira et al., "Hard Limits on Robust Control over Delayed and Quantized Communication Channels with Applications to Sensorimotor Control", 2015 IEEE 54th Annual Conference on Decision and Control, Dec. 2015, 9 pgs.
Nayyar et al., "Decentralized Stochastic Control with Partial History Sharing: A Common Information Approach", IEEE Transactions on Automatic Control, Jul. 2013, vol. 58, No. 7, 15 pgs.
Nayyar et al., "Optimal Control of LQG Systems on Graphs—Part I: Structural Results", arXiv: 1408.2551, 2014, 37 pgs.
Nishihara et al., "A General Analysis of the Convergence of ADMM", in Proceedings of the 32nd International Conference on Machine Learning, 2015, arXiv:1502.02009, 10 pgs.
Palomar et al., "A tutorial on decomposition methods for network utility maximization", IEEE Journal on Selected Areas in Communications, vol. 24, Issue 8, Aug. 2006, pp. 1439-1451.
Papadimitriou et al., "Intractable Problems in Control Theory", SIAM Journal on Control and Optimization, Jul. 1986, vol. 24, No. 4, pp. 639-654.
Perry et al., "Fastpass: A Centralized "Zero-Queue" Datacenter Network", in Proceedings of the 2014 ACM Conference on SIGCOMM, 2014, 12 pgs.
Prescott et al., "Signal Propagation across layered biochemical networks", American Control Conference (ACC), Jun. 2014, pp. 3399-3404.
Rotkowitz et al., "A Characterization of Convex Problems in Decentralized Control", IEEE Transactions on Automatic Control, Feb. 2006, vol. 51, No. 2, pp. 274-286.
Rotkowitz et al., "Convexity of optimal control over networks with delays and arbitrary topology", International Journal Systems, Control and Communications, 2010, vol. 2, Nos. 1/2/3, pp. 30-54.
Scherer, "Structured H∞-optimal control for nested interconnections: A state-space solution", 2013, arXiv: 1305.1746, 17 pgs.
Shah et al., "H2-optimal decentralized control over posets: A state space solution for state-feedback", 49the IEEE Conference on Decision and Control (CDC) 2010, 6 pgs.

(56) References Cited

OTHER PUBLICATIONS

Shah et al., "H2-optimal decentralized control over posets: A state-space solution for state-feedback", IEEE Transactions on Automat Control, Dec. 2013, vol. 58, No. 12, pp. 3084-3096.
Swigart et al., "An explicit state-space solution for a decentralized two-player optimal linear-quadratic regulator", IEEE, American Control Conference, 2010, 6 pgs.
Tanaka et al., "Optimal Output Feedback Architecture for Triangular LQG Problems", arXiv: 1403.4330, 2014, 11 pgs.
Wang et al, "Localized LQR optimal control", Decision and Control (CDC), 2014 IEEE 53rd Annual Conference, Dec. 2014, 21 pgs.
Wang et al., "Localized Distributed Optimal Control with Output Feedback and Communication Delays", IEEE 52nd Annual Allerton Conference of Communication, Control and Computing, Oct. 2014, 9 pgs.
Wang et al., "Localized Distributed State Feedback Control with Communication Delays", in American Control Conference (ACC), Jun. 2014, 9 pgs.
Wang et al., "Localized LQR optimal control for large-scale systems", in ACC 2016, 9 pgs.
Witsenhaussen, "A counterexample in Stochastic optimum control", SIAM Journal on Control, 1968, vol. 6, No. 2, pp. 131-147.
Xu et al., "Link-State Routing with Hop-by-Hop Forwarding Can Achieve Optimal Traffic Engineering", IEEE/ACM Transactions on Networking, Dec. 2011, vol. 19, No. 6, 9 pgs.
Zhao et al., "Design and Stability of Load-Side Primary Frequency Control in Power Systems", IEEE Transactions on Automatic Control, vol. 59, Issue 5, May 2014, pp. 1177-1189.

\* cited by examiner

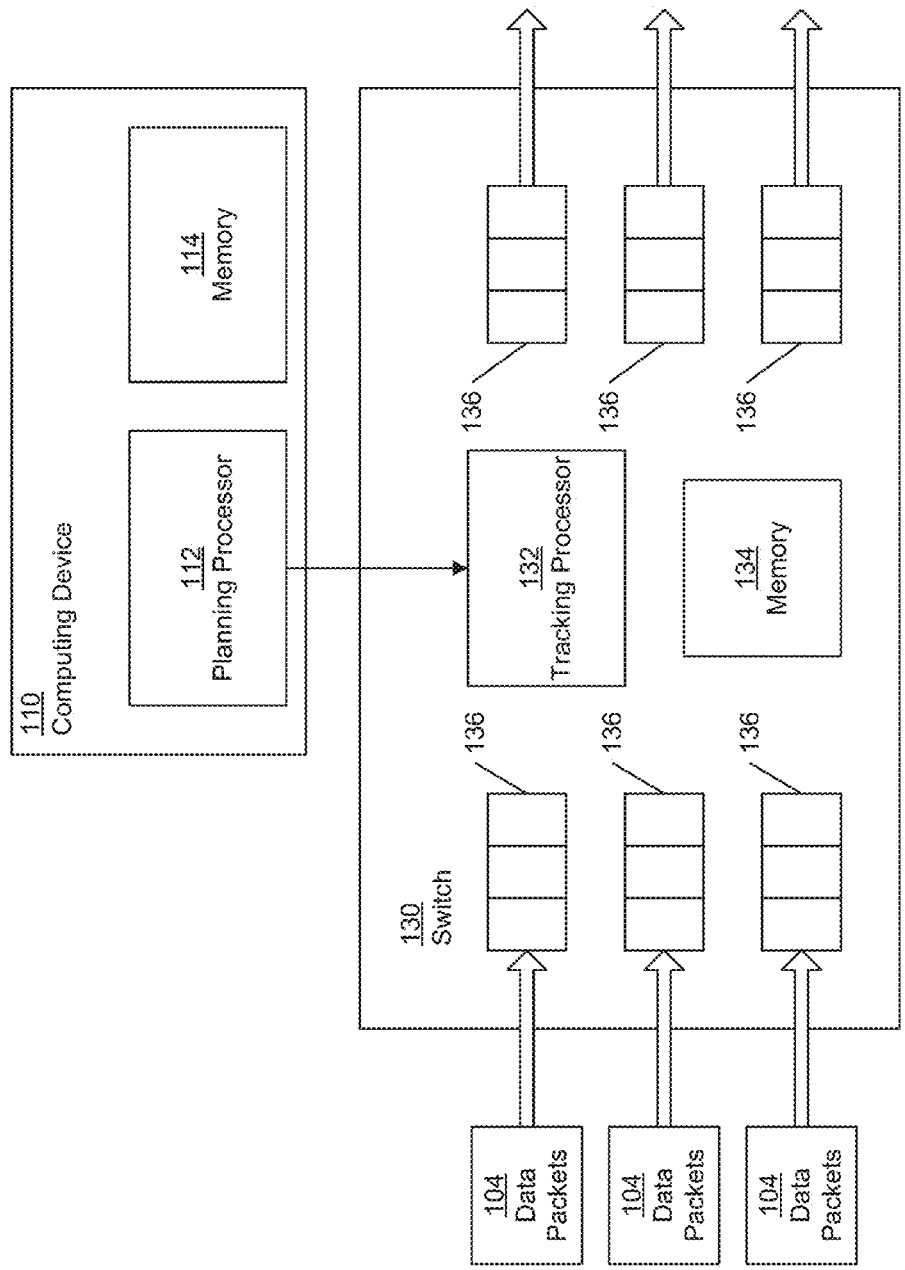

210

Start
↓

210a
Determine a set of states of a switch over a time interval
↓

210b
Send a local system state to a planning processor, the local system state including a subset of the set of states of the switch
↓

210c
Receive a reference trajectory from the planning processor
↓

210d
Compute a control action by solving a tracking problem based on the reference trajectory, such that implementation of the control action achieves a change in the local system state resulting in an actual trajectory that approximates the reference trajectory
↓

210e
Determine an instruction based on the control action
↓

210f
Send the instruction to the switch
↓

Complete

*FIG. 2C*

DATA NETWORK CONTROLLED AND OPTIMIZED USING LAYERED ARCHITECTURES

CROSS-REFERENCE TO RELATED APPLICATIONS

The current application claims priority to U.S. Provisional Patent Application Ser. No. 62/242,836 entitled "Applying dynamics, control and optimization to network control via layered architectures," filed Oct. 16, 2015, U.S. Provisional Patent Application Ser. No. 62/242,853 entitled "Applying dynamics, control and optimization to network control via layered architectures," filed Oct. 16, 2015, and U.S. Provisional Patent Application Ser. No. 62/243,398 entitled "Incorporating Dynamics, Control, Optimization and Virtual Models into a Recursive Layered Architecture," filed Oct. 19, 2015, the disclosures of which are herein incorporated by reference in their entirety.

STATEMENT OF FEDERALLY SPONSORED RESEARCH

This invention was made with government support under Grant No. FA9550-12-1-0085 awarded by the Air Force, Grant No. W911NF-09-D-0001 & Grant No. W911NF-08-1-0233 awarded by the U.S. Army, Grant No. N00014-08-1-0747 awarded by the Office of Naval Research and Grant No. CNS0911041 awarded by the National Science Foundation. The government has certain rights in the invention.

FIELD OF THE INVENTION

This invention generally relates to data networks. More particularly, this invention relates to data networks implemented and optimized using layered architectures.

BACKGROUND

In a data network, computing devices or nodes exchange data via data links. Network nodes may include hosts such as personal computers, phones, or servers, as well as networking hardware such as gateways, routers, network bridges, modems, wireless access points, networking cables, line drivers, switches, hubs, repeaters, or hybrid devices incorporating multiple functionalities. Connections between nodes may be established via cable media or wireless media. Information is typically formatted into packets of data prior to transmission. The packets are sent from one node to another and then reassembled at their destination.

Software-defined networking (SDN) is an approach to data networking that allows for the management of network traffic from a centralized control center, without the need to physically manipulate individual switches. SDN separates the control plane of the network, which makes decisions about where traffic is sent, from the data plane, which forwards traffic to the selected destination. Thus, a controller, or server application, sends rules for handling packets to a switch, or data plane device. The switch may request guidance from the controller as needed, and provide it with information about the traffic being handled. Controllers and switches communicate via an interface such as but not limited to the OpenFlow protocol of the Open Networking Foundation. The SDN approach provides the flexibility of altering network switch rules to suit changing needs of businesses and institutions.

SUMMARY OF THE INVENTION

Data network components and frameworks for the control and optimization of network traffic using layered architectures, in accordance with embodiments of the invention, are disclosed. In one embodiment of the invention, a data network, configured to connect computers to enable transmission of data between a plurality of computers, comprises a switch configured to send data based on an instruction, a data link configured to transfer data from the switch to another switch within the data network, a tracking processor in communication with the switch, and a planning processor in communication with the tracking processor. The planning processor is configured to generate a reference trajectory by receiving a local system state from the tracking processor, calculating a reference trajectory by solving a planning problem, wherein the reference trajectory defines a desired path of change over time in the local system state, and sending the reference trajectory to the tracking processor. The tracking processor is configured to track the reference trajectory by determining a set of states of the switch over a time interval, sending a local system state to the planning processor, the local system state including a subset of the set of states of the switch, receiving the reference trajectory from the planning processor, computing a control action by solving a tracking problem based on the reference trajectory, such that implementation of the control action achieves a change in the local system state resulting in an actual trajectory that approximates the reference trajectory, determining the instruction based on the control action, and sending the instruction to the switch.

In a further embodiment, the data network further comprises a set of buffers within the switch, wherein the set of buffers includes buffer capacities for storing data, the reference trajectory includes a target data flow rate and a target buffer utilization, and the control action is computed based on the buffer capacities, the target data transfer rate and the target buffer utilization.

In another embodiment, the actual trajectory includes an actual data flow rate and an actual buffer utilization, and execution of the instruction by the switch results in data being handled by the set of buffers such that the actual data transfer rate approximates the target data transfer rate and the actual buffer utilization approximates the target buffer utilization.

In a yet further embodiment, the planning problem includes a resource allocation problem that optimizes a weighted sum of a network utility function and a tracking penalty function.

In a still further embodiment, the network utility function optimizes data flows assigned to the data link based on a link capacity and a cost function.

In still another embodiment, the tracking penalty function models the tracking layer's ability to guide the actual trajectory to match the reference trajectory.

In a yet further embodiment, the tracking penalty function is configured to restrict storage of data in a set of buffers.

In yet another embodiment, the planning problem is based on a minimum data flow.

In a further embodiment again, the planning problem is solved using model predictive control (MPC).

In another embodiment again, the tracking problem includes a distributed optimal control problem.

In a further additional embodiment, the tracking processor uses feedback control to track the reference trajectory.

In another further embodiment of the invention, the tracking processor is capable of tracking the reference trajectory given network dynamics, control costs, information sharing constraints, and system noise.

A computing system for optimizing a data network, in still another further embodiment of the invention, comprises a planning processor in communication with a tracking processor, the tracking processor being in communication with a switch of a data network, and a memory connected to the planning processor and configured to store a planning program. The planning program configures the planning processor to generate a reference trajectory for data transfer from the switch via a data link within the data network by receiving a local system state from the tracking processor, the local system state including a state of the switch, calculating a reference trajectory by solving a planning problem, wherein the reference trajectory defines a desired path of change over time in the local system state, and sending the reference trajectory to the tracking processor. The tracking processor is configured to track the reference trajectory by managing data transfer from the switch.

In a still yet further embodiment, the reference trajectory includes a target data flow rate and a target buffer utilization.

In still yet another embodiment, the planning problem includes a resource allocation problem that optimizes a weighted sum of a network utility function and a tracking penalty function.

In a still further embodiment again, the tracking penalty function models the tracking layer's ability to guide an actual trajectory to match the reference trajectory.

In still another embodiment again, the tracking penalty function is configured to restrict storage of data in a set of buffers.

A data network node, in another further embodiment of the invention comprises a switch configured to communicate with a second device within a data network, and to communicate with a tracking processor, and a memory connected to the tracking processor and configured to store a tracking program. The tracking processor is in communication with a planning processor, and the switch is configured to send data via a data link to the second device based on an instruction from the tracking processor. The tracking program configures the tracking processor to track a reference trajectory from the planning processor by determining a set of states of the switch over a time interval, sending a local system state to the planning processor, the local system state including a subset of the set of states of the switch, receiving the reference trajectory from the planning processor, computing a control action by solving a tracking problem based on the reference trajectory, such that implementation of the control action achieves a change in the local system state resulting in an actual trajectory that approximates the reference trajectory, determining the instruction based on the control action, and sending the instruction to the switch.

In a yet further embodiment, the data network node further comprises a set of buffers within the switch, wherein the set of buffers includes buffer capacities for storing data, the reference trajectory includes a target data flow rate and a target buffer utilization, and the control action is computed based on the buffer capacities, the target data transfer rate and the target buffer utilization.

In still further embodiment, the actual trajectory includes an actual data flow rate and an actual buffer utilization, and execution of the instruction by the switch results in data being handled by the set of buffers such that the actual data transfer rate approximates the target data transfer rate and the actual buffer utilization approximates the target buffer utilization.

BRIEF DESCRIPTION OF THE DRAWINGS

FIG. 2A is a diagram illustrating a switch and computing device in accordance with an embodiment of the invention.

FIG. 2C is a flow chart illustrating another method for controlling a data network in accordance with an embodiment of the invention.

DETAILED DESCRIPTION

Figure 1:
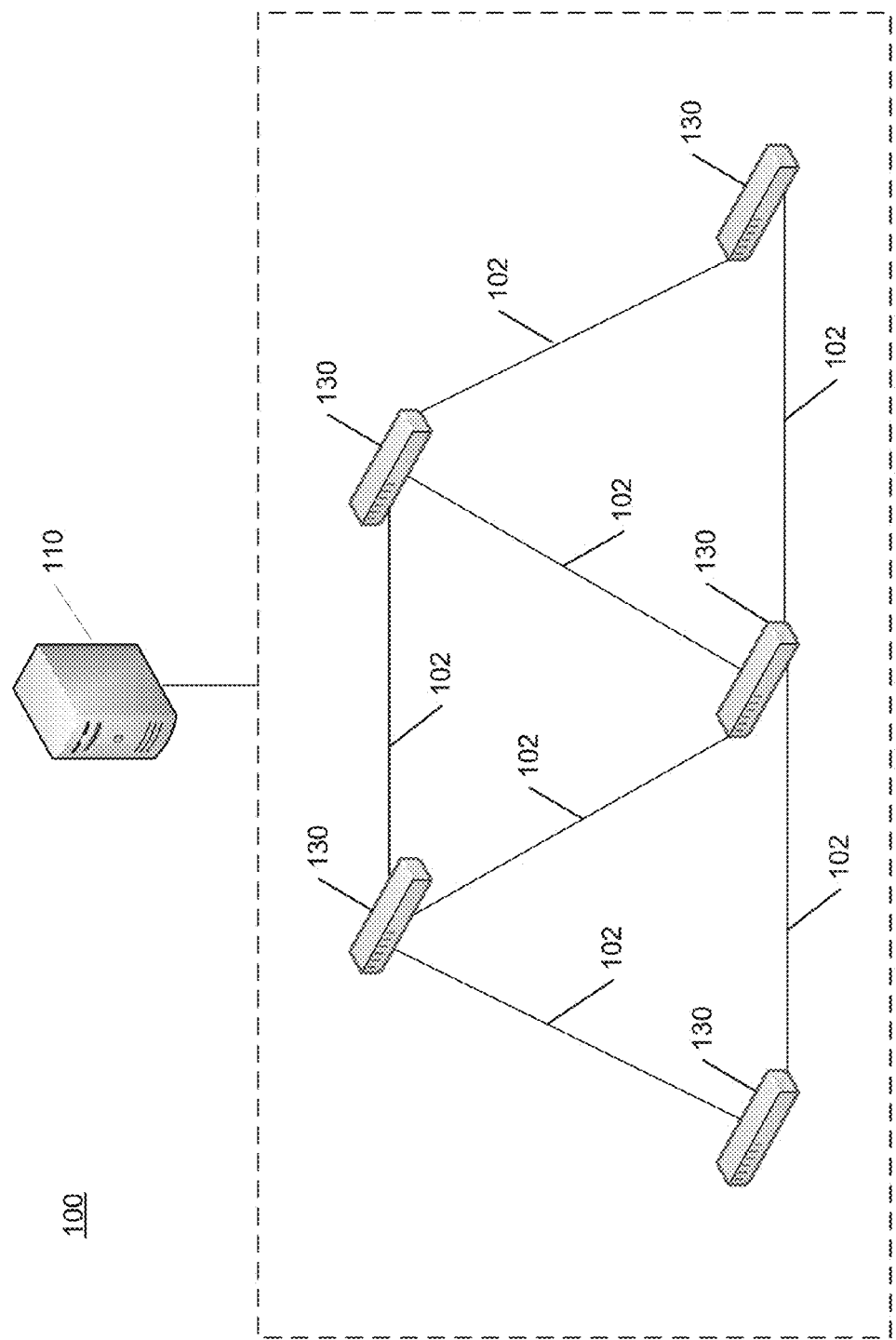
FIG. 1 is a diagram illustrating a data network in accordance with an embodiment of the invention.

Turning now to the drawings, illustrated are data network components and frameworks for the control and optimization of network traffic using layered architectures, in accordance with various embodiments of the invention.

Unique challenges are presented in the management of resources and communications on software-defined networks (SDNs), as well as other distributed systems such as power-grids and the human sensorimotor control system. When controlling or reverse engineering these often large-scale systems, the control engineer is faced with two complementary tasks: that of finding an optimal trajectory (or set-point) with respect to a functional or operational utility, and that of efficiently making the state of the system follow this optimal trajectory (or set-point) despite model uncertainty, process and sensor noise and information sharing constraints.

Layering has proven to be a powerful architectural approach to designing such large-scale control systems. Layered architectures are commonly employed in the Internet, modern approaches to power-grid control, and biological systems. In the context of engineering systems, the layering as optimization (LAO) (such that described in M. Chiang, S. Low, A. Calderbank, and J. Doyle, "Layering as optimization decomposition: A mathematical theory of network architectures," Proc. of the IEEE, vol. 95, no. 1, pp. 255-312. January 2007, the relevant disclosure from which is hereby incorporated by reference in its entirety; and D. Palomar and M. Chiang, "A tutorial on decomposition methods for network utility maximization," IEEE Journal on Selected Areas in Communications, vol. 24, no. 8, pp. 1439-1451, August 2006, the relevant disclosure from which is hereby incorporated by reference in its entirety) and the reverse/forward engineering (such as that described in C. Zhao, U. Topcu. N. Li, and S. Low, "Design and stability of load-side primary frequency control in power systems," IEEE Transactions on Automatic Control, vol. 59, no. 5, pp. 1177-1189, May 2014, the relevant disclosure from which is hereby incorporated by reference in its entirety) paradigm have been fruitful in tackling internet and power-grid control problems, respectively. Both of these frameworks may be viewed as using the dynamics of the system to implement a distributed optimization process, ensuring that the state of the system converges to a set-point that optimizes a utility function. These approaches may scale to large systems by taking advantage of the structure underlying the utility optimization problem, and may simultaneously identify and guarantee stability around an optimal equilibrium point.

A complementary and somewhat orthogonal approach to the control of large scale systems is that considered in the distributed optimal control literature (such as that described in M. Rotkowitz and S. Lall, "A characterization of convex problems in decentralized control," IEEE Transactions on Automatic Control, vol. 51, no. 2, pp. 274-286, 2006, the relevant disclosure from which is hereby incorporated by reference in its entirety; and A. Mahajan, N. Martins, M. Rotkowitz, and S. Yuksel, "Information structures in optimal decentralized control." IEEE 51st Annual Conference on Decision and Control (CDC). December 2012, pp. 1291-1306, the relevant disclosure from which is hereby incorporated by reference in its entirety). In such problems, the assumption is that the optimal set-point has already been specified, and the objective is rather to bring the state of the system to this set-point and keep it there as efficiently as possible, despite disturbances and information sharing constraints between actuators, sensors and controllers. Such approaches are not necessarily scalable, but do utilize knowledge of the system dynamics and information sharing constraints to guarantee optimal transient behavior around a pre-specified equilibrium point.

Thus, these two frameworks may be complementary in their strengths and weaknesses. For instance, although the LAO framework may be extremely flexible and scales seamlessly to large systems, it may not accommodate process or sensor noise, nor may it penalize undesirable transient behaviors. On the other hand, the distributed optimal control framework may naturally handle process and sensor noise and penalize undesirable transient behaviors. However, it may be limited in the types of cost-functions that it can accommodate, and an optimal set-point typically must be pre-specified.

Figure 3:
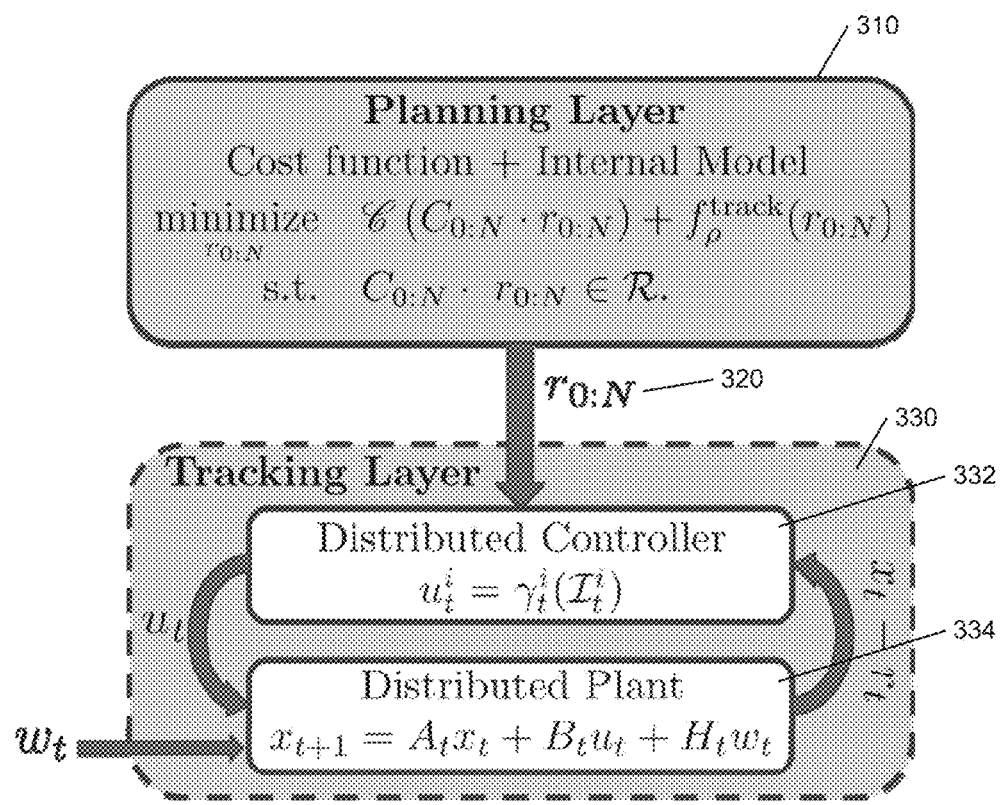
FIG. 3 is a diagram of a layered architecture optimization framework in accordance with an embodiment of the invention.

In some embodiments of the invention, a unifying optimization based methodology combines aspects of the LAO and distributed optimal control frameworks, allowing their respective strengths to be leveraged together in a principled way, such as in the management of a data network 100 shown in FIG. 1. In particular, in certain embodiments of the invention as illustrated in FIG. 3, dynamic versions of the utility optimization problems typically considered in the LAO setting are defined, from which a layered architecture 300 develops via a suitable relaxation of the problem. This architecture may include two layers: a tracking layer 330 and a planning layer 310. The low-level tracking layer 320 may include a distributed optimal controller 332 that tracks a reference trajectory 320 generated by the top-level planning layer 310, where this top layer 310 may include a trajectory planning process that optimizes a function such as (but not limited to) a weighted sum of a utility function and a "tracking penalty" regularizer. The tracking layer process can execute under information sharing constraints by leveraging existing results from the distributed optimal control literature.

Data Networks with Optimization Controllers

In a number of embodiments of the invention, a data network may be controlled via an optimization framework, using a layered architecture with a planning processor and a tracking processor. The tracking processor may track a reference trajectory generated by the planning processor, and communicate local system states to the planning processor. With the tracking processor directing the system to evolve as closely as possible to the reference trajectory from the planning processor, the two layers may aim to optimize network traffic and resources. In certain embodiments, the tracking processor uses feedback control to mitigate the effect of factors leading to the system evolution not exactly matching the reference trajectory, such as but not limited to process, dynamic and model uncertainty and disturbances.

A data network 100 in accordance with several embodiments of the invention is illustrated in FIG. 1. Data network 100 may be configured to connect computers to enable transmission of data between a plurality of computers, and may include switches 130, data links 102, and a computing device 110, in accordance with some embodiments of the invention. Switches 130 may be configured to send data to each other via the data links 102. Data links 102 may be implemented by various methods, including wired and wireless connections.

As illustrated in FIG. 2A, a switch 130 according to a number of embodiments of the invention may include a tracking processor 132, memory 134, and data buffers 136. In certain embodiments of the invention, tracking processor 132 and/or memory 134, may be located outside the switch itself, and may be implemented using various configurations. In a number of embodiments of the invention, memory 134 may contain a tracking program accessed by tracking processor 132 to perform all or a portion of various methods according to embodiments of the invention described throughout the present application. For example, tracking processor 132 may communicate with switch 130 and provide instructions with regard to moving data packets 104 in and out of buffers 136. Buffers 136 may have capacities for data storage, on which decisions regarding data handling may be based. In certain embodiments of the invention, other network devices such as but not limited to routers, gateways, hubs and hybrid devices may be employed in lieu of or in addition to switches 130.

According to many embodiments of the invention, switch 130 as shown in FIG. 2A may be in communication with computing device 110. Computing device 110 may include a server, personal computer, phone, and/or any other computing device with sufficient processing power for the processes described herein. In a number of embodiments of the invention, computing device 110 comprises a planning processor 112 which accesses a planning program stored on memory 114 to perform all or a portion of various methods according to embodiments of the invention described throughout the present application. In other embodiments of the invention, memory 114 may be located outside the computing device itself, and may be implemented using various configurations. In some embodiments of the invention, the planning program may be learned in real time, without initial storage in memory 114. Alternatively, the planning program may be stored in memory 114 and then altered based on observations of executions of the program. As an example, a cost function, dynamics and/or tracking penalties may be updated in real-time based on observations of the system's execution.

Figure 2B:
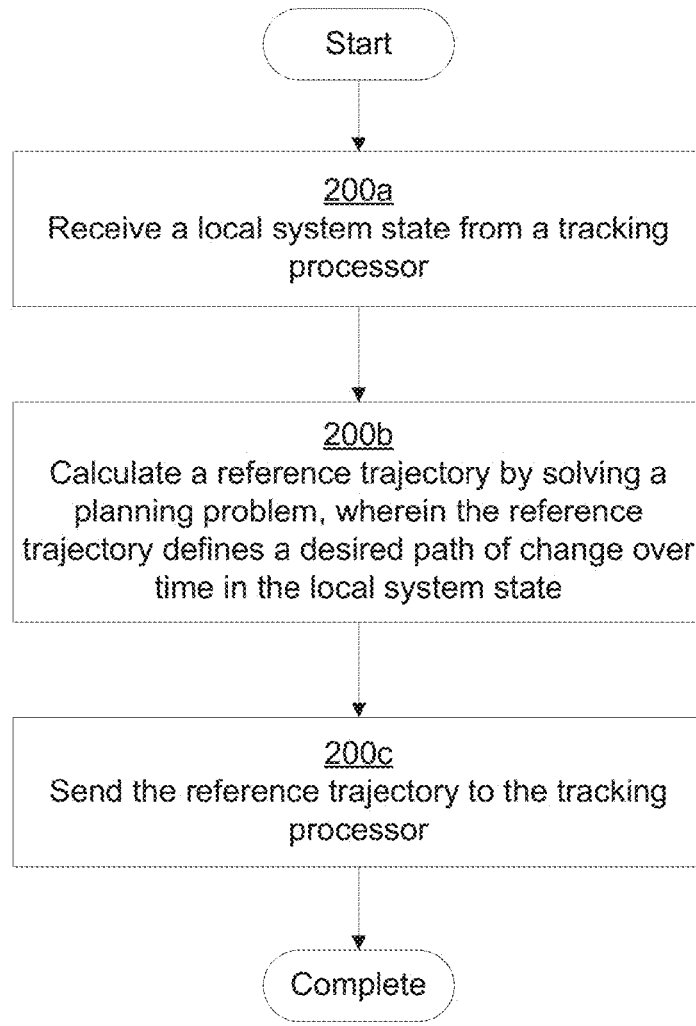
FIG. 2B is a flow chart illustrating a method for controlling a data network in accordance with an embodiment of the invention.

In an optimization framework according to a number of embodiments of the invention, planning processor 112 may communicate with tracking processor 132 in the process of controlling and optimizing traffic and resources of data network 100. Referring to FIGS. 2B-C, in some embodiments of the invention, tracking processor 132 may determine (210*a*) a set of states of the switch 132, or one or a group of network devices, over a time interval. It may, periodically or upon the occurrence of an event, send (210*b*) all or a subset of these local system states to the planning processor 112. The planning processor 112 may receive (200*a*) the local state(s) and calculate (200*b*) a reference trajectory, such as trajectory 320 as described below in reference to FIG. 3, by solving a planning problem. The reference trajectory according to certain embodiments of the invention defines a desired path of change over time in the local system state. The planning processor 112 may send (200*c*) the reference trajectory to the tracking processor 132. According to some embodiments of the invention, the tracking processor 132 computes (210*d*) a control action by solving a tracking problem based on the received (210*c*) reference trajectory. In many embodiments of the invention, the tracking problem is solved in closed form offline, such that the online computation of the control action is very fast, and typically involves only a small number of matrix/vector multiplies (as opposed to more involved optimization based computation). Implementation of this control action may achieve a change in the local system state resulting in an actual trajectory that approximates the reference trajectory. In certain embodiments of the invention, in the absence of process noise, the actual and reference trajectories may be identical. Based on the control action, the tracking processor 132 may determine (210*e*) and send (210*f*) an instruction to the switch 130.

The processors 112/132 described above may refer to one or more devices that can be configured to perform computations via machine readable instructions stored within memories 114/134. The processors 112/132 may include one or more microprocessors (CPUs), one or more graphics processing units (GPUs), and/or one or more digital signal processors (DSPs). As can be readily appreciated, a variety of hardware and software architectures can be utilized to implement the above-described network and devices in accordance with several embodiments of the invention.

Although data networks and devices, and an optimization framework therefor, are described above with respect to FIGS. 1-2, any of a variety of network structures and computing devices for managing data traffic and network resources as appropriate to the requirements of a specific application can be utilized in accordance with embodiments of the invention. The problem formulation for determining a reference trajectory according to some embodiments of the invention are described below.

Problem Formulation $\mathbb{R}$

Notation: For a sequence of vectors $x_t \in \mathbb{R}^n$, $t=0, \ldots, N$, $x_{0:N}$ is used to denote the signal $(x_t)_{t=0}^N$. Similarly, given a sequence of matrices $M_t$, $t=0, \ldots, N$, and a sequence of vectors $x_t$ of compatible dimension. $M_{0:N} \cdot x_{0:N}$ is used to denote the signal $(M_t x_t)_{t=0}^N$. $Z$ is used to denote the block upshift matrix, that is, a block matrix with identity matrices along the first block super-diagonal, and zero elsewhere. Similarly, $E_i$ denotes a block column matrix with the ith block set to identity, and all others set to 0. Finally, $I_n$ denotes the n×n identity matrix. Unless required for the discussion, dimensions are not explicitly denoted and all vectors, operators and spaces are assumed to be of compatible dimension throughout.

In certain embodiments of the invention, the problem may be formulated considering linear dynamics described by $$x_{t+1} = A_t x_t + B_t u_t + H_t w_t, z_t = C_t x_t, x_0 \text{ given} \tag{1}$$

where $x_t$ is the state of the system at time t, $z_t$ is the controlled output, $w_t$ is the process noise driving the system, $u_t$ is the control input, and $x_0$ is a known initial condition. Any realization of the disturbance signal $w_{0:N}$ may be restricted to be in $l_\infty$.

An assumption is made that the plant, or system to be controlled, described by the dynamics (18) is distributed and composed of p subsystems. Each subsystem is assigned a corresponding subset $x_t^i$, $u_t^i$, $w_t^i$ and $z_t^i$ of the signals described in (18), corresponding to the state, control action, process noise and controlled output at subsystem i. Assumptions are made that the matrices $B_t$, $H_t$ and $C_t$ are block-diagonal (these assumptions may be relaxed for some of the distributed controller synthesis methods referenced in Table 1), and that each $A_t$ admits a compatible block-wise partition $(A_t^{ij})$. This problem may be formulated such that the overall problem is computationally tractable. Specifically, the assumptions of LTI dynamics and convex costs/constraints, as well as partially nested information sharing, may be sufficient for the resulting problem to be efficiently solvable. The dynamics at subsystem i may thus be described by $$x_{t+1}^i = A_t^{ii} x_t^i + \Sigma_{j:A_t^{ij} = 0} A_t^{ij} x_t^j + B_t^{ii} u_t^i + H_t^{ii} w_t,$$

$$z_t^i = C_t^{ii} x_t^i. \tag{2}$$

In this problem formulation, control tasks are considered with respect to non-traditional cost functions, as specified in optimization problem (5), subject to information sharing constraints. In order to impose such information sharing constraints, the information set $\mathfrak{I}_t^i$ available to a controller at node i at time t is defined as $$\mathfrak{I}_t^i := \{x_{0:t-\tau_{i1}}^1, z_{0:t-\tau_{i2}}^2, \ldots, x_{0:t}^i, \ldots, x_{0:t-\tau_{ip}}^p\}, \tag{3}$$

where $\tau_{ij}$ is the communication delay from subsystem j to subsystem i. The information sets are defined with a state-feedback setting in mind: the definition extends to the output feedback setting by replacing the state x with the measured output y. It is then said that a control law $u_t$ respects the information sharing constraints of the system if the control action $u_t^i$ taken at time t by subsystem i is a function of the information set $\mathfrak{I}_t^i$, i.e., if there exists some Borel measurable map $\gamma_t^i$ such that $$u_t^i = \gamma_t^i(\mathfrak{I}_t^i) \tag{4}$$

for each subsystem i. The problem may be focused in particular on partially nested information structures, which satisfy the important property that for every admissible control policy $\gamma$, whenever $u_s^i$ affects $\mathfrak{I}_t^j$, then $\mathfrak{I}_s^i \subseteq \mathfrak{I}_t^j$. This property implies that a class of distributed optimal control problems admits a unique optimal policy that is linear in its information set. This may be built on to prove the main technical result below in the section Tracking Problems with Analytic Solutions.

The control task to be solved may be specified by the following optimization problem $$\underset{x_{0:N}, u_{0:N-1}}{\text{minimize}} \mathscr{C}(z_{0:N}) + \|D_{0:N-1} \cdot u_{0:N-1}\|_w \quad (5)$$

s.t. dynamics (18), distributed constraints (4), $z_{0:N} \in \mathcal{R}$ where $\mathscr{C}(\bullet)$ is a convex cost function, $D_{0:N}$ is a collection of matrices $D_t$ satisfying $D_t^T D_t \succ 0$, $\|\bullet\|_w$ is a suitable signal-to-signal penalty such as $\mathbb{E}_w \|\bullet\|_2^2$ (corresponding to an linear-quadratic-Gaussian[LQG]-like penalty if the disturbances $w_t$ are taken to be jointly Gaussian), $\max_{\|w\|_{l_2} \leq 1} \|\bullet\|_2^2$ (corresponding to an $\mathcal{H}\infty$ like penalty) or $\max_{\|w\|_\infty \leq 1} \|\bullet\|_\infty$ (corresponding to an $\mathcal{L}_1$ like penalty), and $\mathcal{R}$ defines a convex constraint set on the controlled output $z_{0:N}$.

The interpretation of this problem is straightforward: select a state trajectory $x_{0:N}$ that optimizes the cost function $\mathscr{C}(\bullet)$ and that respects the constraint $z_{0:N} \in \mathcal{R}$, that can be achieved with a reasonable control effort despite the dynamics and information sharing constraints of the system. A number of embodiments of the invention provide a framework for satisfactorily combining tools developed for distributed optimization (such as LAO) and distributed optimal control, and certain embodiments allow for the flexibility and scalability of LAO to be combined with the desirable transient behavior achieved by distributed optimal controllers, thus broadening the collective scope and applicability of these approaches.

The following paragraphs highlight special cases of problem (5) that may be solved using existing controller synthesis frameworks.

No Dynamics or Control Cost:

If the dynamic constraint (18) and the control cost $\|D_{0:N} \cdot u_{0:N-1}\|_w$ are removed from optimization problem (5), it reduces to a static optimization problem in the variable $x_{0:N}$. The layering as optimization (LAO) framework and the forward/reverse engineering framework have proven to be powerful tools in controlling large scale systems by using system dynamics to solve such a static optimization problem in a scalable way. In particular, under suitable and somewhat idealized conditions (namely in the absence of noise), these methods provably converge to an optimum of the original optimization problem. The resulting control schemes should thus be viewed as stabilizing controllers around such an optimal equilibrium point. However, since the dynamics of the system are not explicitly considered in the optimization problem, this framework does not optimize the trajectory taken by the system to reach this optimal equilibrium point.

No State Constraints and Control Theoretic Cost Function:

If the output constraints $z_{0:N} \in \mathcal{R}$ are dropped from optimization problem (5), and the cost function $\mathscr{C}(\bullet)$ is taken to be a suitable control theoretic cost such as the LQG or $\mathcal{H}_\infty$ cost function, then this reduces to a distributed optimal control problem. If the information constraints are such that the resulting control problem is partially nested (alternatively quadratically invariant), then one may solve for the resulting linear distributed optimal controller in many cases of interest (such as those cases described below in the section Tracking Problems with Analytic Solutions) by leveraging recent results from the distributed optimal control community. A limitation of this approach is that it only applies to a few cost functions, which may only be applied to systems that have a pre-specified equilibrium point.

No Information Sharing Constraints and No Driving Noise:

If the information sharing constraints $u_t^i = \gamma_t^i(\mathcal{I}_t^i)$ are removed from optimization problem (5) and the driving noise $w_{0:N-1}$ is set to 0, the resulting optimization problem is identical to subproblems solved in the context of model predictive control (MPC) (such as that described in M. Morari and J. H. Lee, "Model predictive control: past, present and future," Comp. & Chem. Eng., vol. 23, no. 4-5, pp. 667-682, 1999, the relevant disclosure from which is hereby incorporated by reference in its entirety). Although extensions of model predictive control to distributed settings do exist, they may not be sufficiently flexible in dealing with information sharing constraints as analogous results in the distributed optimal control literature, especially in the output feedback setting. However, an advantage of MPC is its ability to naturally accommodate nonlinearities, and in particular actuator saturation. Thus, embodiments of the present invention may be extended to nonlinear systems by incorporating the presently described framework into the MPC scheme.

In light of the foregoing discussion, to solve optimization problem (5), an optimal trajectory must be identified while simultaneously ensuring that the system can effectively track this trajectory despite the system dynamics (18), the control cost $\|D_{0:N-1} \cdot u_{0:N-1}\|_w$, the information sharing constraints (4) of the controller and the driving noise of the system. In certain embodiments of the present invention, a relaxation-based approach is presented, inspired by the notion of vertical layering in the LAO framework to functionally separate the tasks of planning an optimal trajectory and efficiently tracking it. This separation allows for the tracking problem to be solved as a traditional distributed optimal control problem, independent of the planning problem. That is, when the tracking problem admits an analytic solution, it follows that optimization problem (5) then reduces to a suitably modified planning problem in which the tracking cost acts as a regularizer. This framework is described in further detail in the following section.

Vertical Layering with Dynamics

In an optimization framework according to many embodiments of the invention, a separation is created between the tasks of planning an optimal trajectory and synthesizing a controller to ensure that the state of the system efficiently tracks said trajectory. Some embodiments of the invention may employ the following relaxation to optimization problem (5): introduce a redundant "reference" variable $r_{0:N}$ constrained to satisfy $C_{0:N} \cdot r_{0:N} = z_{0:N}$, and then relax this equality constraint to a soft constraint in the objective function of the problem. The resulting relaxed optimization problem is then given by:

$$\underset{r_{0:N}}{\text{minimize}} \mathscr{C}(C_{0:N} \cdot r_{0:N}) + \overbrace{\underset{x_{0:N}, u_{0:N-1}}{\text{minimize}} \left\| \begin{matrix} \rho C_{0:N} \cdot (x_{0:N} - r_{0:N}) \\ D_{0:N-1} \cdot u_{0:N-1} \end{matrix} \right\|_w}^{\text{Tracking problem}} \quad (6)$$

s.t. $C_{0:N} \cdot r_{0:N} \in \mathcal{R}$ s.t. dynamics (18), distributed constraints (4)

where $\rho > 0$ is the tracking weight. In certain embodiments of the invention, this relaxation achieves the goal of separating the planning problem from the tracking problem. In particular, for a fixed $r_{0:N}$ the right most optimization problem, labeled as "Tracking Problem" in optimization problem (6), is completely independent of the cost function $\mathscr{C}(\bullet)$ and the constraint set $\mathscr{R}$.

With this relaxation, it may no longer be guaranteed that the state trajectory satisfies $C_{0:N} x_{0:N} \in \mathscr{R}$. It may be noted, however, (i) that relaxing state constraints in this way is a standard approach in the LAO framework; (ii) that the optimal reference trajectory satisfies $C_{0:N} r_{0:N} \in \mathscr{R}$; and (iii) that under nominal operating conditions (i.e., for the noise $w_{0:N}$ set to 0), $C_{0:N} x_{0:N} \approx C_{0:N} r_{0:N}$ for sufficiently large $\rho$.

A Layered Architecture

According to the optimization framework of some embodiments of the invention, an assumption is made that for a fixed reference trajectory $r_{0:N}$, the tracking problem specified in optimization problem (6) admits an analytic solution such that its objective at optimality is given by a function $f_\rho^{track}(r_{0:N})$ that is convex in $r_{0:N}$, and a further assumption is made that the optimal feedback policies $\gamma_t^i$ may be computed such that the controller achieving the tracking cost $f_\rho^{track}(r_{0:N})$ can be implemented as a function of the reference trajectory $r_{0:N}$. The optimization problem (6) may be rewritten as $$\underset{r_{0:N}}{\text{minimize}}\, \mathscr{C}(C_{0:N} \cdot r_{0:N}) + f_\rho^{track}(r_{0:N}) \text{ s.t. } C_{0:N} \cdot r_{0:N} \in \mathscr{R}. \quad (7)$$

In accordance with a number of embodiments of the invention, optimization problem (7) may be interpreted and implemented as a layered architecture. As illustrated in FIG. 3, in accordance with some embodiments of the invention, layered architecture 300 is obtained through the relaxation-based solution to optimization problem (5). The architecture 300 has two layers, a low-level tracking, or reflex, layer 330, and a high-level planning layer 310. Whereas the tracking layer 330 is cost-function-agnostic, the planning layer 310 possesses an internal model of the tracking layer's ability to follow a given reference trajectory 320.

In some embodiments of the invention, the low-level tracking layer 330 comprises the distributed optimal controller 332 in feedback with the distributed plant 334, and drives the evolution of the system to match that specified by the reference trajectory 330 received from the planning layer 310 above. In order to determine this reference trajectory 330, in certain embodiments of the invention the planning layer 310 optimizes the weighted sum of a utility cost function $\mathscr{C}$ and a tracking penalty $f_\rho^{track}$. The tracking penalty $f_\rho^{track}$ may be interpreted as a model or simulation of the tracking layer's response to a given reference trajectory $r_{0:N}$. By replacing the explicit dynamic constraints (18) with the function $f_\rho^{track}$, which captures the behavior of the optimal closed loop response of the system, optimization problem (7) is now static. The static nature of the problem may imply that much as in the LAO framework, well-established distributed optimization techniques can be applied to solve it. Furthermore, as the reference trajectory $r_{0:N}$ is now a virtual quantity, various methods may be used to implement an optimization process.

The next section presents a class of problems for which the prerequisite analytic expressions for $f_\rho^{track}$ and $\gamma_t^i$ can be obtained using existing methods from the traditional and distributed optimal control literature.

Tracking Problems with Analytic Solutions

This section focuses on a tracking problem, according to certain embodiments of the invention, with a LQG-like cost-function that is subject to centralized reference information constraints and distributed state information constraints. Below, further details are provided regarding the meaning of these information sharing constraints, showing that in this setting, the optimal tracking policy is unique and linear in its information, and can be constructed using existing results from the distributed optimal control literature. A discussion of alternative noise assumptions, performance metrics, and more complex reference information constraints may be found below in the Discussion section.

In a number of embodiments of the invention, the disturbances $w_t$ are taken to be identically and independently drawn from a zero mean normal distribution with identity covariance, i.e., $$w_t \stackrel{i.i.d.}{\sim} \mathcal{N}(0, I),$$

and mean square error signal-to-signal metric is used, i.e., $\|z_{0:N}\|_w = \Sigma_{t=0}^N \mathbb{E}_w \|z_t\|_2^2 \cdot e_t := x_t - r_t$ denotes the tracking error between the state $x_t$ and the reference $r_t$, and $r_t^T := [r_t^T\ r_{t+1}^T\ \ldots\ r_N^T\ 0^T\ \ldots\ 0^{TT}] \in \mathbb{R}^{1 \times Nn}$ denotes a suitably zero-padded stacked vector of references $r_{t:N}$. Letting $$\tilde{A}_t := \begin{bmatrix} A_t & (A_t E_1^T - E_2^T) \\ 0 & Z \end{bmatrix}, \tilde{B}_t := \begin{bmatrix} B_t \\ 0 \end{bmatrix}, \tilde{H}_t := \begin{bmatrix} H_t \\ 0 \end{bmatrix},$$

the Tracking Problem specified in optimization problem (6) may be rewritten in terms of $e_t$ and $r_t$ as $$\underset{e_{0:N}, u_{0:N}}{\text{minimize}} \sum_{t=0}^{N-1} \mathbb{E}_w[e_t^T Q_t e_t + u_t^T R_t u_t] + \mathbb{E}_w[e_N^T Q_N e_N] \quad (8)$$

$$\text{s.t. } \begin{bmatrix} e_{t+1} \\ r_{t+1} \end{bmatrix} = \tilde{A}_t \begin{bmatrix} e_t \\ r_t \end{bmatrix} + \tilde{B}_t u_t + \tilde{H}_t w_t$$

$e_0$ and $r_0$ given, $u_t^i = \gamma_t^i(\mathcal{I}_t^i \cup \mathcal{J}_t^i)$ for all $i$ where $Q_t := \rho C_t^T C_t$ and $R_t := D_t^T D_t$.

Here the state information set $\mathcal{I}_t^i$ available to node i at time t is specified by (3), and the corresponding reference information set $\mathcal{J}_t^i$ is specified by $$\mathcal{J}_t^i := \{r_{0:t-\kappa_{i1}}^1, r_{0:t-\kappa_{i2}}^2, \ldots, r_{0:t}^i, \ldots, r_{0:t-\kappa_{ip}}^p\} \quad (9)$$

where $\kappa_{ij}$ is the reference communication delay from node j to node i. Allowing for $\kappa_{ij} \leq \tau_{ij}$, i.e., for the stacked reference trajectory $r_t$ to possibly be communicated faster than states $x_t$ of the system, cases may be accommodated in which reference following is performed in a centralized manner but disturbance rejection is performed in a distributed manner.

In a number of embodiments of the invention, it is assumed that information available to the planning layer is globally available to the tracking layer. i.e., that $\mathcal{J}_t^i = \{x_0, r_{0:t}\}$ for all sub-controllers i, but that information pertaining to the state, i.e., $\mathcal{I}_t^i$, is constrained as in (3) but partially nested (Y.-C. Ho and K.-C. Chu. "Team decision theory and information structures in optimal control problems—part i." IEEE Transactions on Automatic Control, vol. 17, no. 1, pp. 15-22, 1972 [hereinafter "Ho and Chu"], the relevant disclosure from which is hereby incorporated by reference in its entirety).

Thus, considering optimization problem (8), and supposing that $\mathcal{J}_t^i = \{x_0, r_{0:t}\}$ and that $\mathcal{I}_t^i$ defines a partially nested information sharing constraint, the optimal control policies $\gamma_t^i$ exist, are unique, and are linear in their information set according to some embodiments of the invention.

Exploiting the linearity of the optimal policies, the error state $e_t$ may be decomposed into a deterministic component $d_t$ and a centered stochastic component $s_t$ that obey the following dynamics:

$$d_{t+1} = \tilde{A}_t d_t + \tilde{B}_t \mu_t, \; d_0 = \begin{bmatrix} e_0 \\ r_o \end{bmatrix} \quad (10a)$$

$$s_{t+1} = \tilde{A}_t s_t + \tilde{B}_t v_t + \tilde{H}_t w_t, \; s_0 = 0 \quad (10b)$$

$$\begin{bmatrix} e_t \\ r_t \end{bmatrix} = s_t + d_t. \quad (10c)$$

where $\mu_t$ is a linear map acting on the globally available deterministic information set $\mathcal{D}_t = \{d_{0:t}\}$ and $v_t$ is a linear map with components $v_t^i$ satisfying $v_t^i = v_t^i(\mathcal{S}_t^i)$, with the stochastic information set $\mathcal{S}_t^i$ available to node i at time t specified by $$\mathcal{S}_t^i := \{s_{0:t-\tau_{i1}}^1, s_{0:t-\tau_{i2}}^2, \ldots, s_{0:t}^i, \ldots, s_{0:t-\tau_{ip}}^p\}.$$

In particular, the delays specifying the information sharing constraints in $\mathcal{S}_t^i$ may be inherited from the state information sharing constraints as specified in equation (3). Further, for all $t \geq 0$, it holds that $\mathbb{E}[s_t] = 0$ and consequently that $\mathbb{E}[d_t s_t^T] = 0$.

Thus, assuming that $\mathcal{I}_t^i = \{x_0, r_{0:t}\}$ and that $\mathcal{I}_t^i$ defines a partially nested information sharing constraint, the tracking problem (8) can be decomposed into a reference following problem (RFP)

$$\underset{d_{0:N}, \mu_{0:N}}{\text{minimize}} \sum_{t=0}^{N-1} d_t^\top Q_t d_t + \mu_t^\top R_t \mu_t + d_N^\top Q_N d_N \quad (\text{RFP})$$

s.t. dynamics (10a), $\mu_t = \mu_t(\mathcal{D}_t)$, and a disturbance rejection problem (DRP)

$$\underset{s_{0:N}, v_{0:N}}{\text{minimize}} \sum_{t=0}^{N-1} \mathbb{E}[s_t^\top Q_t s_t + V_t^\top R_t V_t] + \mathbb{E}[s_N^\top Q_N s_N] \quad (\text{DRP})$$

s.t. dynamics (10b), $v_t^i = v_t^i(\mathcal{S}_t^i)$ for all i.

The disturbance reference problem (DRP) may thus be independent of the reference trajectory $r_t$. This implies that the tracking penalty $f_p^{track}$ to be used in the planning layer optimization problem (7) may be specified by the optimal cost of the reference following problem (RFP), which may be seen to be a standard centralized linear quadratic regulator (LQR) problem. Therefore, the optimal tracking cost may be given by $$f_p^{track}(r_{0:N}) = \begin{bmatrix} x_0 - r_0 \\ r_0 \end{bmatrix}^\top P_0 \begin{bmatrix} x_0 - r_0 \\ r_0 \end{bmatrix}, \quad (12)$$

and achieved by the policy $\mu_t = -K_t d_t$, for $P_t$ and $K_t$ specified by the Riccati recursions $$P_t = \tilde{A}_t^\top \begin{bmatrix} Q_t & 0 \\ 0 & 0 \end{bmatrix} \tilde{A}_t - \tilde{A}_t^\top P_{t+1} \tilde{B}_t K_t, \quad (13)$$

-continued $$P_N = \begin{bmatrix} Q_N & 0 \\ 0 & 0 \end{bmatrix},$$

$$K_t = (R_t + \tilde{B}_t^\top P_{t+1} \tilde{B}_t)^{-1} \tilde{B}_t^\top P_{t+1} \tilde{A}_t.$$

The optimal control policies $v_t^i$ for the disturbance rejection problem (DRP) can be computed for many interesting information patterns using existing results from the classical and distributed optimal control literatures—a selection of relevant results are listed in Table 1. Some of the results are presented for infinite horizon problems, but may be easily modified to accommodate finite horizon problems with zero mean initial conditions. Here SF and OF denote state and output feedback, respectively. The resulting optimal costs change as a function of the information constraints of the system, but they are independent of the reference trajectory $r_{0:N}$ and do not affect the planning optimization problem (7).

TABLE 1

| Information Pattern | Reference(s), all relevant disclosures from which are hereby incorporated by reference in their entirety |
|---|---|
| Centralized SF + OF | K. Zhou, J. C. Doyle, and K. Glover, Robust and Optimal Control. Upper Saddle River, NJ, USA: Prentice-Hall, Inc., 1996. |
| Delay and/or Sparsity Constrained SF | A. Lamperski and L. Lessard, "Optimal state-feedback control under sparsity and delay constraints," in 3rd IFAC Workshop on Distributed Estimation and Control in Networked Systems, 2012, pp. 204-209. A. Lamperski and J. Doyle, "Dynamic programming solutions for decentralized state-feedback lqg problems with communication delays," in American Control Conference (ACC), June 2012, pp. 6322-6327. P. Shah and P. Parrilo, "H2 - optimal decentralized control over posets: A state-space solution for state-feedback," Automatic Control, IEEE Transactions on, vol. 58, no. 12, pp. 3084-3096, December 2013. |
| Delay and/or Sparsity Constrained OF | A. Lamperski and J. C. Doyle, "The H2 control problem for quadratically invariant systems with delays," Automatic Control, IEEE Transactions on. vol. 60, no. 7, pp. 1945-1950, July 2015. A. Nayyar and L. Lessard, "Optimal control for lqg systems on graphs - Part I: Structural results," arXiv preprint arXiv: 1408.2551, 2014. T. Tanaka and P. A. Parrilo, "Optimal output feedback architecture for triangular LQG problems," arXiv preprint arXiv: 1403.4330, 2014. |

Discussion

This section provides a brief discussion of useful extensions of the results presented thus far, according to various embodiments of the invention.

Rapid Trajectory Generation

The approach suggested above may allow for trajectories that can be exactly or approximately followed by the system in a computationally efficient manner. In some embodiments of the invention, in the case of a LQG-like tracking problem, the resulting tracking penalty is a quadratic form defined by a positive semi-definite matrix $P_0$. Letting $P_0 := U \Lambda U^T$ be an eigen-decomposition of $P_0$, where the columns $u_i \in \mathbb{R}^{nT}$ of the eigen-matrix U form an orthonormal basis for the space of trajectories of horizon N, and $\Lambda = \text{diag}(\lambda_i)$ is a diagonal matrix with nonzero values $\lambda_i$ the corresponding eigenvalues, a trajectory may be written as $r_{0:T} = \Sigma_i \alpha_i u_i$, for $\alpha_i \in \mathbb{R}$ some scalars. This in turns allows the planning problem (7) to be rewritten as $$\underset{\alpha}{\text{minimize}} \; \mathscr{C}(m(\alpha, U)) + \alpha^\top \lambda \quad (14)$$

$$\text{s.t.} \; m(\alpha, U) \in \mathcal{R},$$

for $\alpha := (\alpha_i)_i$ a stacked vector of the coefficients $\alpha_i$, $\lambda := (\lambda_i)_i$ a stacked vector of the eigenvaluves $\lambda_i$, and m a suitable affine map defined in terms of the matrices $C_{0:N}$ such that $m(\alpha, U) = z_{0:N}$.

In many embodiments of the invention, computational advantages may arise from this formulation by a priori setting coefficients $\alpha_i$ to 0 if their corresponding eigenvalues $\lambda_i \gg 1$, effectively trimming certain directions in trajectory space, such as those that are difficult to track, prior to solving the optimization problem. In particular, if the set $\mathcal{S}$ of eigenvalues satisfying $\lambda_i \gg 1$ is large, then this can significantly reduce the size of the coefficient vector $\alpha$ relative to that of the original trajectory $r_{0:N}$. More precisely, for a trajectory $r_{0:N} \in \mathbb{R}^{nN}$ and set of large eigenvlaues $\mathcal{S}$ of size S, the number of nonzero optimization variables is equal to nN-S, which $\mathcal{S}$ may lead to significant gains in computational efficiency for S sufficiently large.

Virtual Dynamics & Recursive Layered Architectures

The layered architecture presented above in the Vertical Layering with Dynamics section may include a static planning problem and a dynamic tracking layer. In certain embodiments of the invention, a cyber-physical system may have more than two layers, with each layer operating on different simplified models of the underlying system. The vertical layering approach previously described can be modified to include virtual (and possibly simpler) dynamics in the planning layer, and in such a way the relaxation approach can be applied recursively to yield a multi-layered system.

As a preliminary example, consider a familiar "live demo" that illustrates the inclusion of several layers, with higher layers using simpler dynamic models. In particular, consider the task of filling a glass of water and taking a drink. Any conscious planning and execution is typically done with simple arm and glass positions and velocities. These positions and velocities are then converted to the muscle torques and forces needed to move the glass and compensate for the changing water weight. Similarly, these actions at the muscular level are effected by changes at the cellular level, and in turn actions at the cellular level are effected by changes at the macromolecular level. In this example the use of layering allows for functional tasks to be rapidly planned and executed in a simple virtual space, without explicitly accounting for the bewildering complexity of one's underlying physiology and biochemistry.

To see how such a recursive layered architecture can be synthesized using the suggested relaxation approach of some embodiments of the invention, consider the following modified planning problem obtained by adding virtual dynamics (described by state matrices $M_t$ and control matrices $N_t$) to (7):

$$\underset{r_{0:N}}{\text{minimize}} \; \mathscr{C}(r_{0:N}^{state}) + f_\rho^{track}(r_{0:N}) \quad (15)$$

$$\text{s.t.} \; r_{0:N}^{state} \in \mathcal{R}, \; r_{t+1}^{state} = M_t r_t^{state} + N_t r_t^{input}.$$

Here the reference $r_t$ has been partitioned into a virtual state component $r_t^{state}$ and a virtual control input component $r_t^{input}$, and it is assumed that $C_{0:N} \cdot r_{0:N} = r_{0:N}^{state}$. This specific decomposition of the reference state is not necessary, but makes the exposition clearer.

Problem (15) is of a very similar form to that of the optimization problem (5) originally considered, and a similar vertical decomposition may be applied to that used to obtain (6). In particular, by introducing a redundant higher-level virtual quantity $h_t$ constrained to satisfy $h_t = r_t^{state}$ and suitably relaxing this to a soft constraint in the objective, the following is obtained:

$$\underset{h_{0:N}}{\text{minimize}} \; \mathscr{C}(h_{0:N}) \quad (16)$$

$$\text{s.t.} \; h_{0:N} \in \mathcal{R}$$

<u>Intermediate Tracking Problem</u>
$$\underset{r_{0:N}}{\text{minimize}} \; \lambda \| h_{0:N} - r_{0:N}^{state} \| + f_\rho^{track}(r_{0:N}) +$$

$$\text{s.t.} \; r_{t+1}^{state} = M_t r_t^{state} + N_t r_t^{input},$$

where $\lambda > 0$ denotes the "intermediate tracking problem" weight. As in the Vertical Layering with Dynamics section above, assume that an analytic solution to the intermediate tracking problem is available such that its cost can be expressed via a function $g_\lambda^{interm}(h_{0:N})$ convex in $h_{0:N}$, and that this cost can be achieved using a feedback policy $r_t^{input}(h_{0:t})$ (this assumption holds if LQG like penalties are used throughout). Optimization problem (16) then reduces to a planning optimization problem of exactly the same form as (7) save for the use of $g_\lambda^{interm}$ in lieu of $f_\rho^{track}$.

Figure 4:
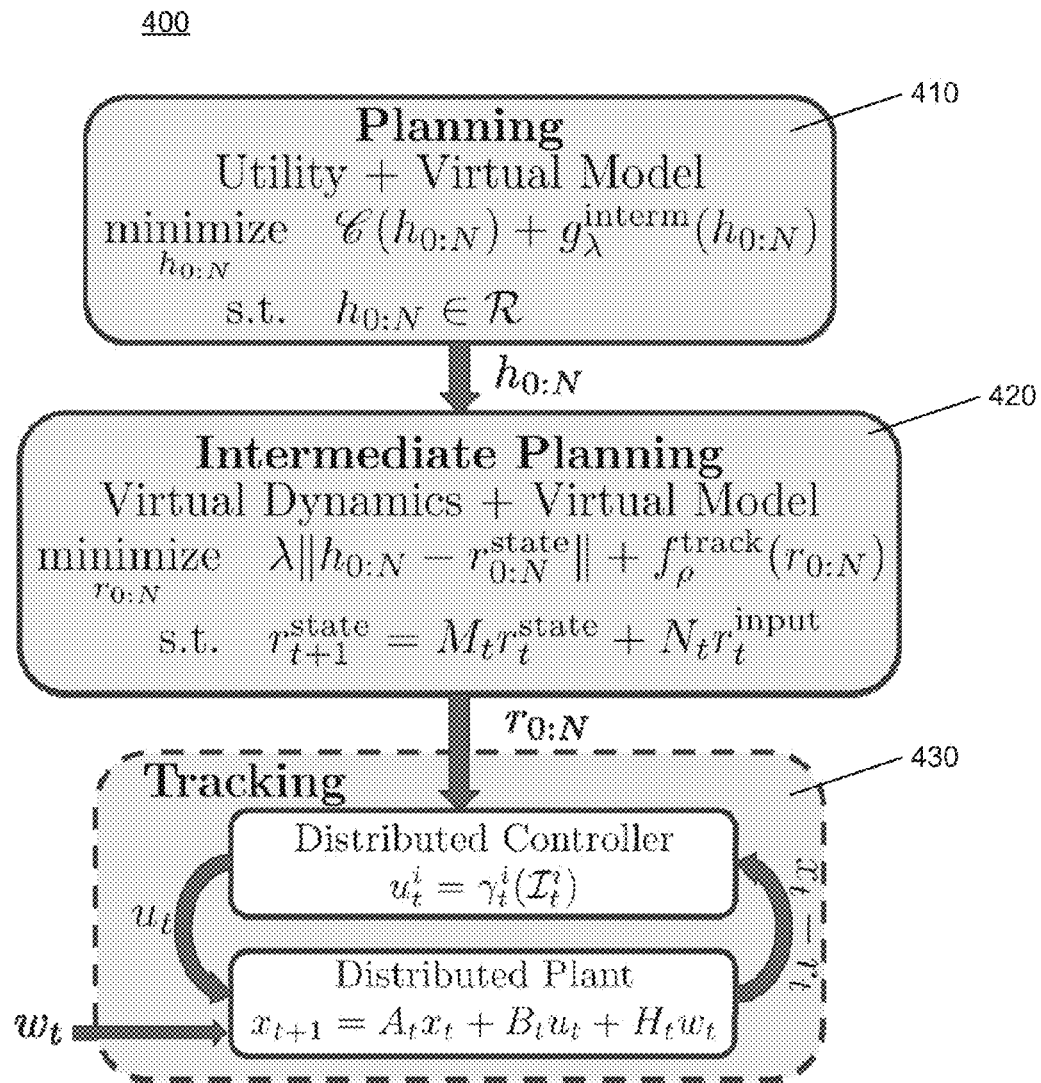
FIG. 4 is a diagram of a three-tiered layered architecture optimization framework in accordance with an embodiment of the invention.

FIG. 4 illustrates the resulting three-tiered layered architecture 400 obtained by recursively applying the proposed relaxation based solution to optimization problem (5), in accordance with a number of embodiments of the invention. The architecture 400 may include three layers: a low-level tracking, or reflex, layer 430, an intermediate tracking layer 420 acting on virtualized dynamics, and a high-level static planning layer 410.

Note that the higher-level virtual state $h_t \approx r_t^{state}$ may be of a smaller dimension than that of the full reference quantity $r_t$. In some embodiments of the invention, model reduction may be performed in the context of a layered architecture of optimal controllers. In particular, the tracking penalty $f_\rho^{track}$ restricted to the range of the virtual dynamics can be used to quantify the ability of the tracking-layer to emulate the simple and possibly lower-order virtual dynamics used in the higher layers, thus providing a measure of how well the desired virtualization can be implemented.

Real-Time Planning

In some embodiments of the invention, the planner is able to solve optimization problem (7) before the system moves. In other embodiments of the invention, planning may need to occur in real time. A straightforward way to incorporate real-time planning into the previously described framework is to have the planning layer implement an optimization process, such as gradient de-scent, and to allow the planning layer to run K iterations of this process per time step t of the dynamics. The updates to the reference trajectory may simply be modeled as noise entering the reference trajectory state $r_t$ in the augmented state dynamics specified in (8). In particular, the error dynamics may be given by $$\begin{bmatrix} e_{t+1} \\ r_{t+1} \end{bmatrix} = \tilde{A}_t \begin{bmatrix} e_t \\ r_t \end{bmatrix} + \tilde{B}_t u_t + \tilde{H}_t w_t + \begin{bmatrix} 0 \\ I \end{bmatrix} \Delta r_t, \quad (17)$$

where $\Delta r_t$ contains the reference trajectory update computed after K iterations of the optimization process, i.e., $\Delta r_t = r_t^{(tK)} - r_t^{((t-1)K)}$ for $r_t^{(k)}$ the kth iterate of the process.

Alternative Tracking Metrics

In many embodiments of the invention, using a LQG like tracking metric allows for the decomposition of the tracking problem (8) into two independent subproblems, each of which can be solved using existing techniques from the literature. This separation principle may not extend to induced norms such as the $\mathcal{H}_\infty$ or $\mathcal{L}_1$ norms, thus motivating the need to holistically consider the tracking problem. For instance, if both the state information set $\mathcal{I}_t$ and reference information set $\mathcal{J}_t$ are centralized and the tracking metric is taken to be a finite horizon $\mathcal{H}_\infty$ cost function, then the methods from T. Basar and P. Bernhard, H-infinity optimal control and related minimax design problems: a dynamic game approach, Springer Science & Business Media, 2008 (the relevant disclosure from which is hereby incorporated by reference in its entirety), can be used to solve the resulting tracking problem. Interestingly, the tracking penalty $f_\rho^{track}$ is also a quadratic form, just as the tracking penalty (12) of the LQG tracking problem, but is specified by the solution to a modified Riccati recursion. Solutions to the finite horizon $\mathcal{L}_1$ optimal control problem with known initial conditions may be particularly relevant to sensorimotor control.

Numerical Example

As an example according to several embodiments of the invention, consider linear time-invariant (LTI) dynamics (18) describing a discrete-time single integrator with sampling time $\tau$:

$$A_{di} = \begin{bmatrix} 1 & \tau \\ 0 & 1 \end{bmatrix}$$

$$B_{di} = \begin{bmatrix} 0 \\ \tau \end{bmatrix}, H_{di} = .1\tau I_2$$

and suppose that two such double integrators are dynamically coupled via randomly generated matrices $A_{12}$ and $A_{21}$. The dynamics (18) of the coupled system are then specified by $$A_{2di} = \begin{bmatrix} A_{di} & A_{12} \\ A_{21} & A_{di} \end{bmatrix}, B_{2di} = \begin{bmatrix} B_{di} \\ & B_{di} \end{bmatrix}, H_{2di} = \begin{bmatrix} H_{di} \\ & H_{di} \end{bmatrix}$$

This example imposes the following distributed constraints on the control laws $$u_t^1 = \gamma_t(x_{0:t}^1, x_{0:t-1}^2, x_0, r_{0:t}), u_t^2 = \gamma_t(z_{0:t-1}^1, x_{0:t}^2, x_0, r_{0:t});$$

i.e., each subsystem can communicate its state to its neighbor with a delay of one time-step, and that the reference trajectory is globally available. Following the approach described above in the Tracking Problems with Analytic Solutions section, an LQG-like tracking metric is used, and the resulting tracking problem (8) satisfies the assumptions that $\mathcal{J}_t^i = \{x_0, r_{0:t}\}$ and that $\mathcal{I}_t^i$ defines a partially nested information sharing constraint. Thus the tracking problem may be decomposed into a centralized reference following program (RFP) and a distributed disturbance rejection problem (DRP), where this latter problem can be solved via the methods of A. Lamperski and J. Doyle, "Dynamic programming solutions for decentralized state-feedback lqg problems with communication delays," in American Control Conference (ACC), June 2012, pp. 6322-6327 (the relevant disclosure from which is hereby incorporated by reference in its entirety).

Figure 5B:
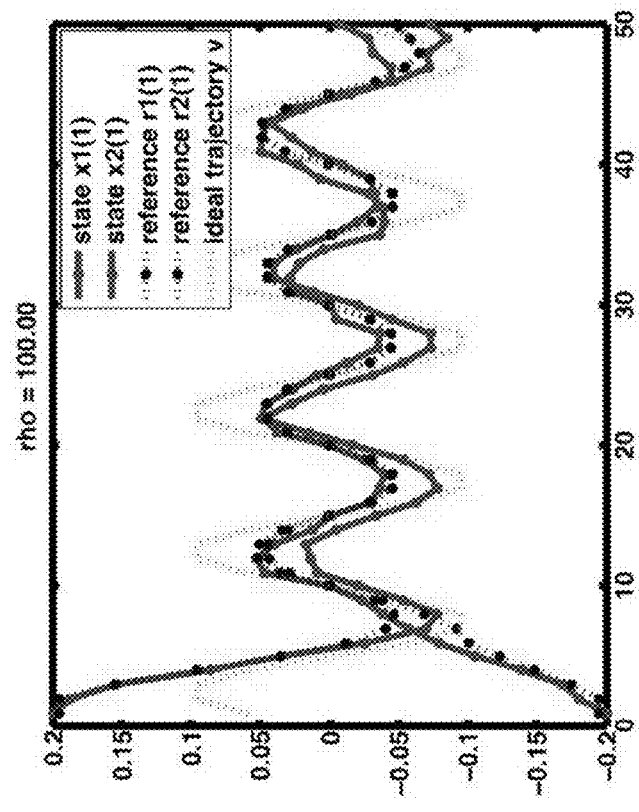
FIGS. 5A-D are diagrams showing sample trajectories in accordance with an embodiment of the invention.
Figure 5A:
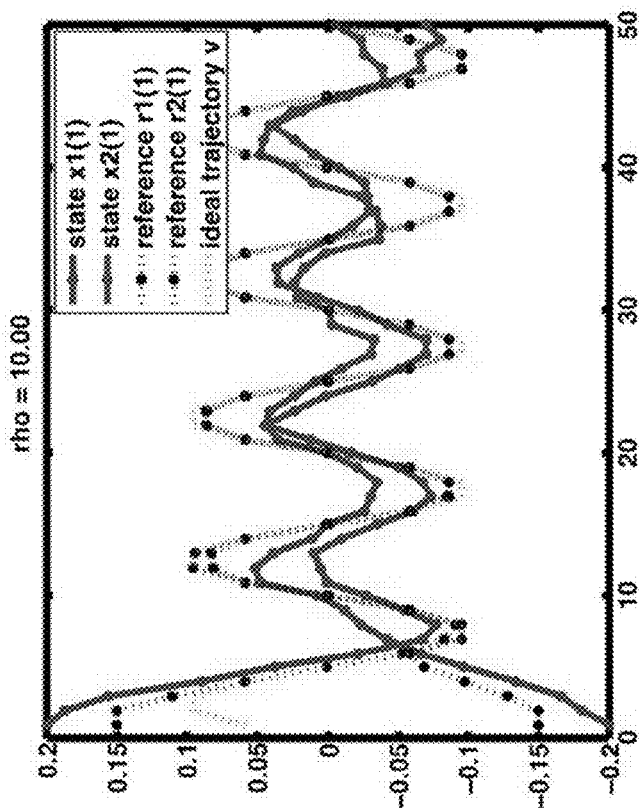
Figure 5D:
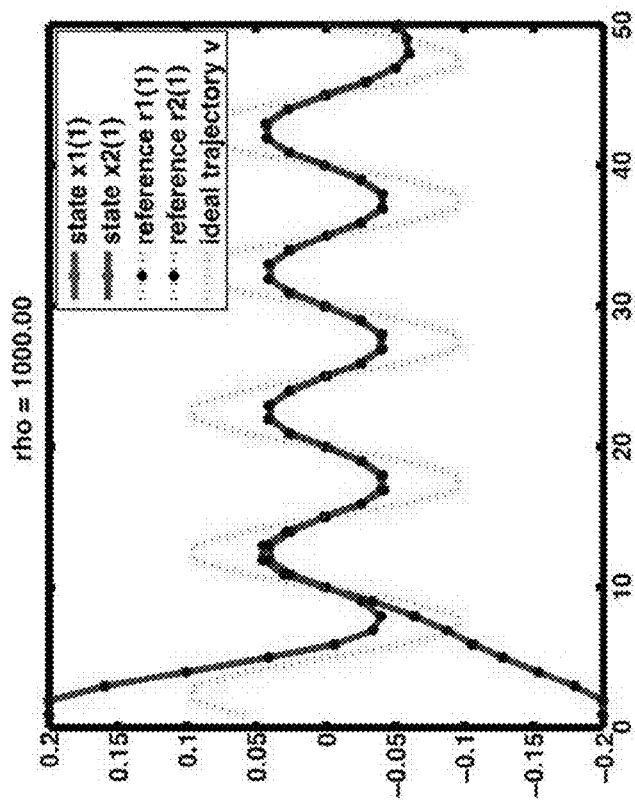
Figure 5C:
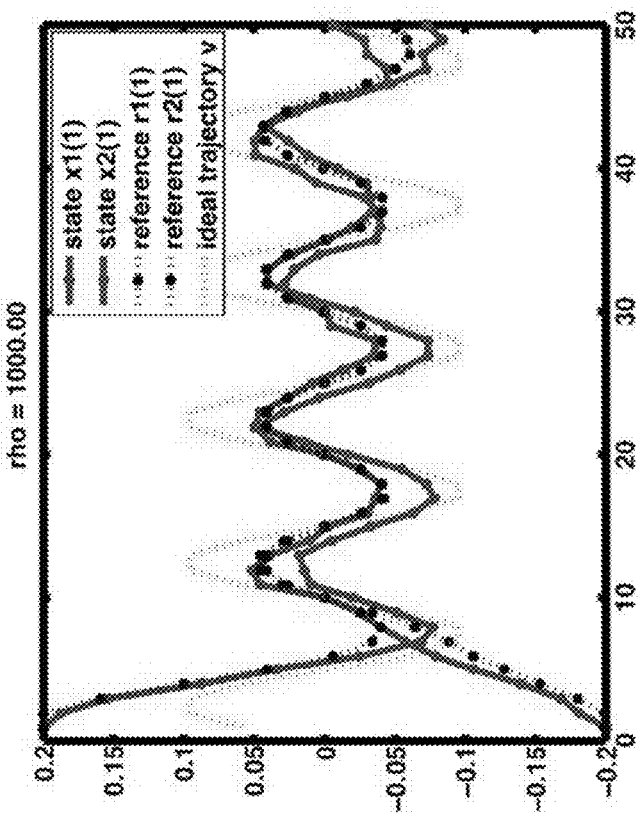

The control penalty may be taken as $R_t=0.01I_2$, let $$v_t = .1 \sin\left(\frac{2\pi}{10}t\right)$$

and the cost function defined as $\mathcal{C}(r_{0:N}) = \sum_{t=0}^{N} |r_t^1(1) - v_t| + |r_t^2(1) - v_t|$, where $r_t^i(1)$ denotes the reference position coordinate of double-integrator i. It may be assume for this example that there are no state-constraints $\mathcal{R}$. Thus the planning goal is to minimize the total variation between the position of $\mathcal{R}$ each double integrator and a sinusoidal reference trajectory. For the numerical examples, $\tau=0.1$ and $x_0=[0.2, 0, -0.2, 0]^T$. Shown in FIGS. 5A-D are the state trajectories for varying levels of $\rho$. As $\rho$ increases, the relaxation becomes increasingly tight. As the system is being driven by noise, the reference may not be tracked exactly, even as $\rho$ grows. Solving the problem with no driving noise (i.e., $H_{di}=0$), the result is shown in FIG. 5D. Notice that the optimal trajectory is different from $v_t$ because of the nonzero control cost $R_t=0.01$ $I_2$. In this case, the original optimization problem (5) may be solved, and the solution computed via relaxation (6) may be numerically verified to be exact for sufficiently large $\rho$.

Dynamics, Control and Optimization in Layered Network Architectures

Software-defined networking (SDN) allows designers to increase the flexibility, elasticity and responsiveness of network applications by vertically distributing their functionality across the application, control and data planes. In a number of embodiments of the invention, an SDN optimization approach is based on Layering as Optimization (LAO) decomposition and Network Utility Maximization (NUM) and explicitly incorporates dynamics and distributed control.

Figure 6A:
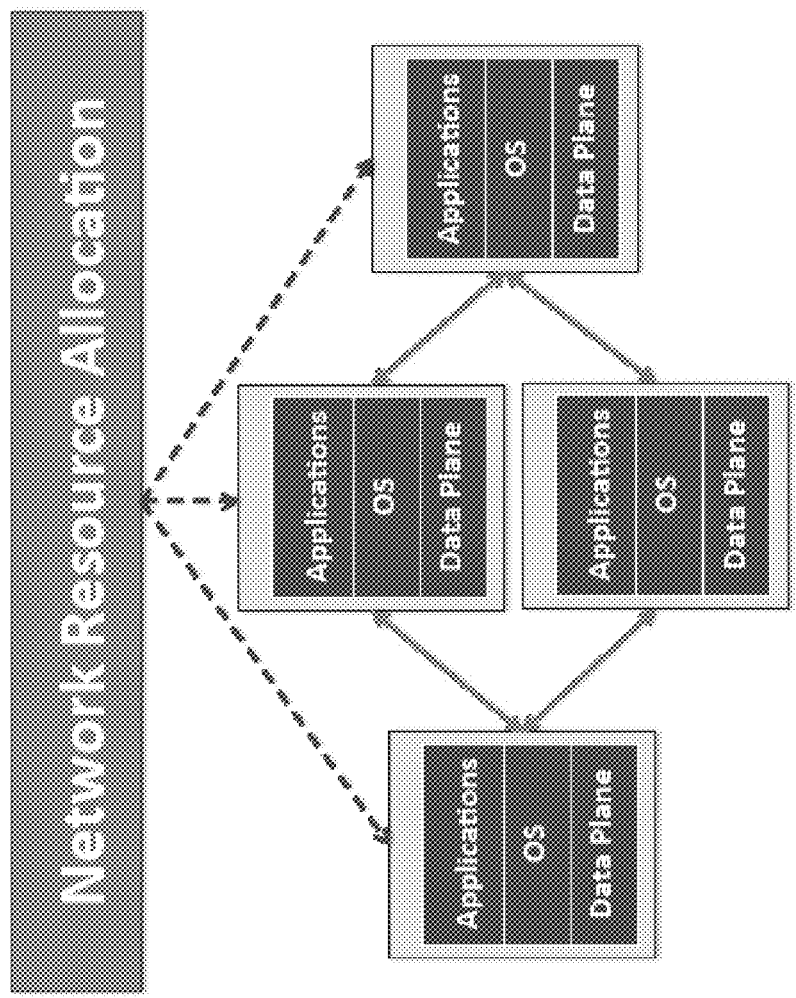
FIG. 6A is a diagram showing a traditional layered architecture in accordance with an embodiment of the invention.
Figure 6B:
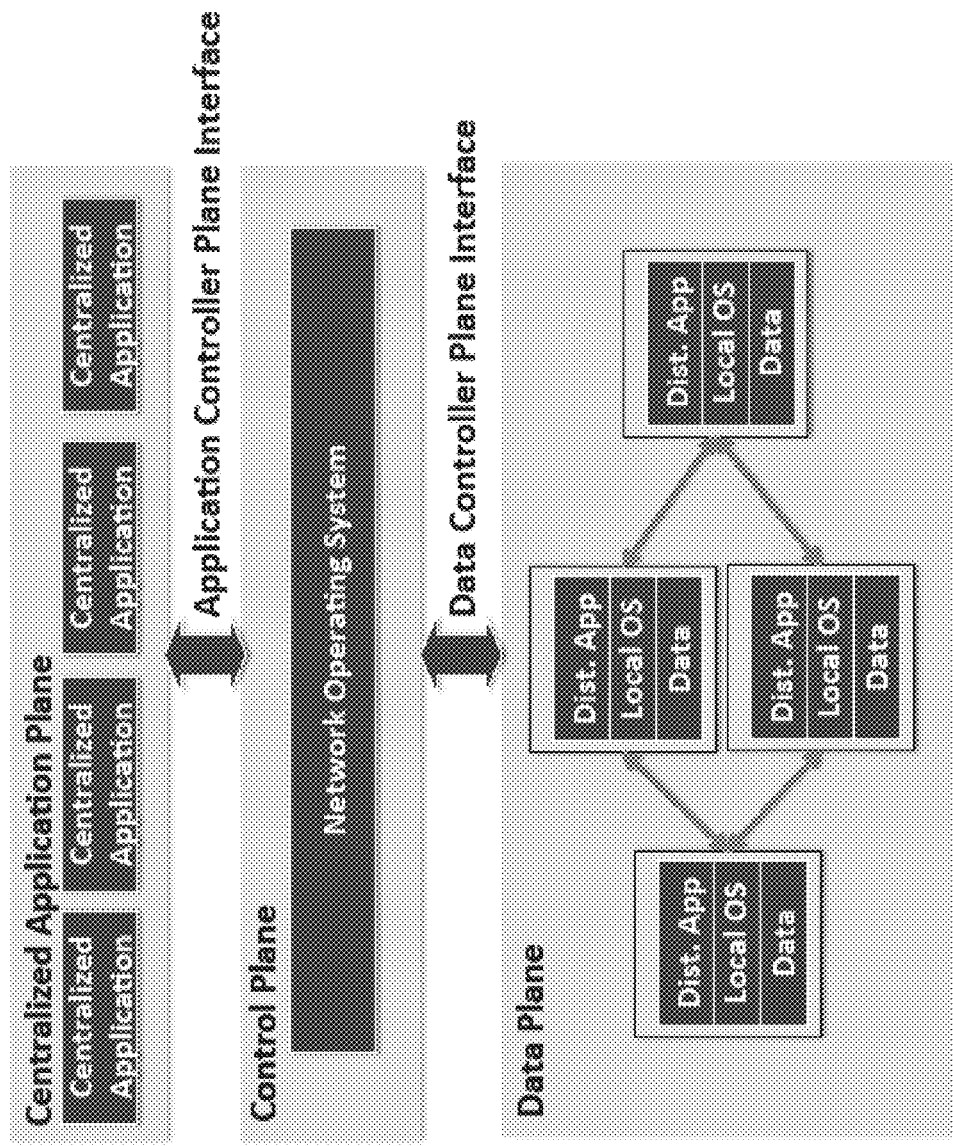
FIG. 6B is a diagram showing an HySDN layered architecture in accordance with an embodiment of the invention.
Figure 6C:
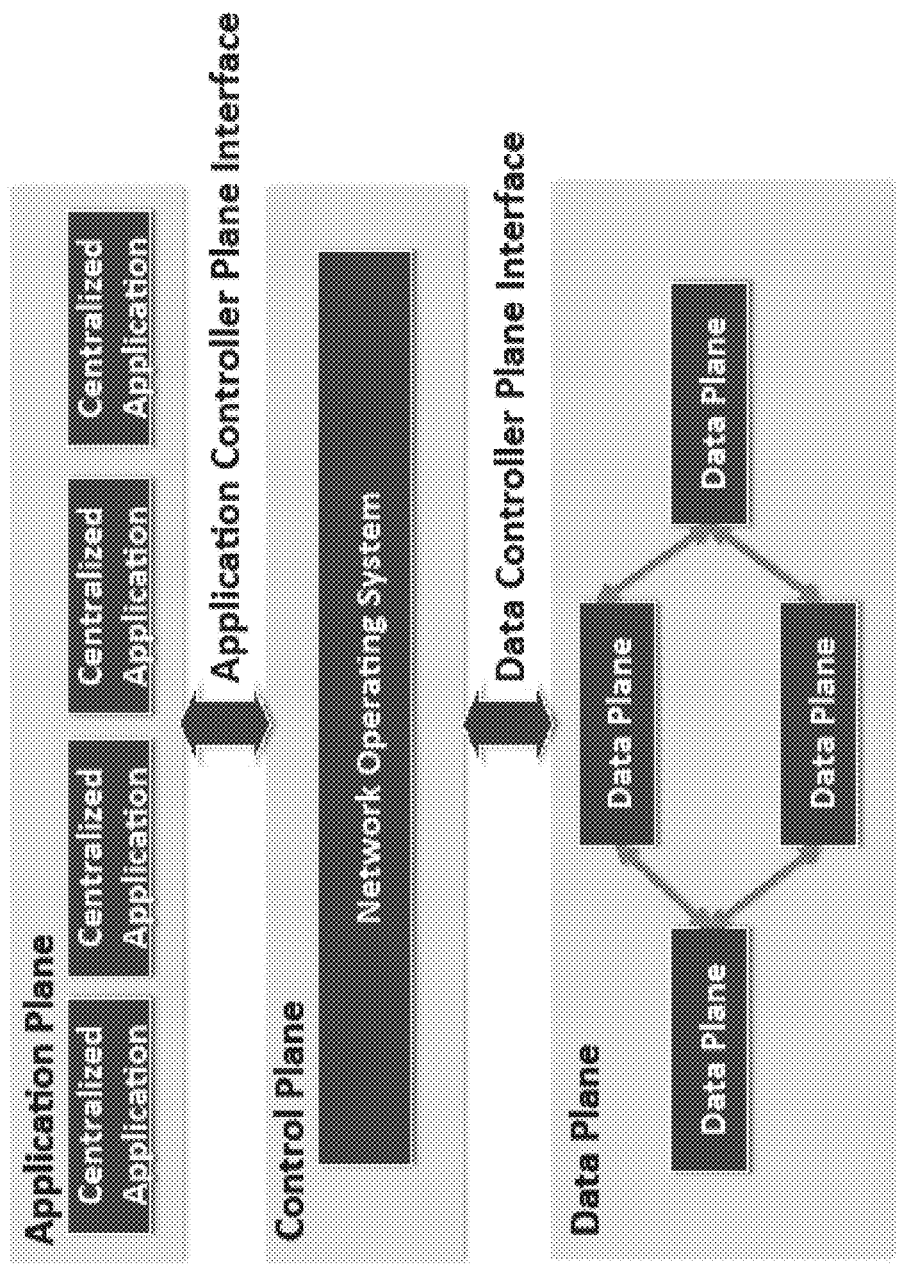
FIG. 6C is a diagram showing a xSDN layered architecture in accordance with an embodiment of the invention.

Network control methods are often faced with two complementary tasks: (i) finding an optimal operating-point with respect to a functional utility, and (ii) efficiently bringing the state of the network to this optimal operating-point despite model uncertainty, fast-time scale dynamics and information sharing constraints. The Layering as Optimization (LAO) decomposition (D. P. Palomar and M. Chiang, "A tutorial on decomposition methods for network utility maximization." IEEE J. Sel. A. Commun., vol. 24, no. 8, pp. 1439-1451, August 2006, the relevant disclosure from which is hereby incorporated by reference in its entirety) technique applied to Network Utility Maximization (NUM) (M. Chiang, S. Low, A. Calderbank, and J. Doyle, "Layering as optimization decomposition: A mathematical theory of network architectures," Proceedings of the IEEE, vol. 95, no. 1, pp. 255-312, January 2007, the relevant disclosure from which is hereby incorporated by reference in its entirety) problems may be an effective means of addressing task (i), as these techniques focus on network resource allocation problems, and offer a formal approach to designing layered architectures (via vertical decompositions of a NUM problem) and distributed methods (via horizontal decompositions of a NUM problem) that guarantee convergence to a functionally optimal network operating-point (e.g., as specified by a congestion control or traffic engineering problem). However, the LAO/NUM frameworks are generally built around static optimization problems that do not explicitly incorporate network dynamics or information sharing constraints. By contrast, it has been shown, in N. Matni, A. Tang, and J. C. Doyle, "A case study in network architecture tradeoffs," in Proceedings of the 1st ACM SIGCOMM Symposium on Software Defined Networking Research, ser. SOSR '15. New York, N.Y., USA: ACM, 2015, pp. 18:1-18:7 (hereinafter "SOSR paper"), the relevant disclosure from which is hereby incorporated by reference in its entirety, that task (ii) may be addressed using tools from distributed optimal control theory. The SOSR paper also argued that these tools provide a principled means of exploring the effects of different distributed control architectures, ranging from fully myopic (with no coordination between network elements) to fully centralized (as illustrated in FIGS. 6A-C), on network performance and demonstrated these ideas with an admission control (AC) case study.

Many embodiments of the present invention significantly extend existing results by presenting a method that jointly addresses tasks (i) and (ii) in a unified optimization based framework that can be viewed as a natural extension of the LAO/NUM methodologies to the SDN paradigm. In particular, some embodiments of the invention extends the optimization based frameworks of LAO/NUM to explicitly incorporate fast-time scale network dynamics and distributed information sharing constraints, allowing the network designer to fully exploit the flexibility, elasticity and responsiveness introduced by the SDN paradigm. Along with the flexibility afforded by embodiments of the invention, design challenges exist, such as deciding which aspects of network functionality should be implemented in the application plane, which components of network structure should be virtualized by the control plane, and which elements of network control should remain in the data plane. In principle, SDN allows for any combination of centralized, virtualized and decentralized functionality to be vertically distributed across the application, control and data planes. Certain embodiments of the invention inform these architectural decisions.

According to some embodiments of the invention, the optimization framework described earlier in the present application may be applied to an Hybrid SDN architecture. In particular, the increased responsiveness in network control afforded by SDN allows for joint network resource allocation and disturbance rejection problems to be posed and solved using novel network control architectures. Both traditional and centralized (or "extreme") SDN architectures can be recovered as special cases of the optimization framework of certain embodiments of the invention. Addition-ally novel hybrid SDN architectures may be defined, that divide network functionality between the application, control and data plane using vertical decompositions that are akin to those used in the LAO/NUM framework. The usefulness of this framework is illustrated by applying it to a joint traffic engineering (TE) and AC problem, for which the corresponding HySDN design space are defined and explored. FIGS. 6A-C show the different layered architectures considered for the joint TE/AC problem studied, ranging from traditional (FIG. 6A) to extreme SDN (FIG. 6C) network structures.

The following section discusses the combination of the LAO/NUM and optimal control frameworks, into a framework that leverages the use of dynamics, control and optimization in layered architectures.

LAO/NUM, Optimal Control & SDN

This section discusses (i) LAO decomposition as applied to NUM problems and (ii) the distributed optimal control paradigm as applied to disturbance rejection problems. The LAO/NUM paradigm may be employed as a principled approach to designing layered network architectures that optimally allocate resources within the network—i.e., LAO/NUM yields a network resource "planner"—whereas the distributed control paradigm may be employed as a network "controller" that ensures that the network state remains close to a value specified by the resource planner. Traditionally the network resource allocation and network control tasks were either (i) vertically combined in the data plane due to limitations in network controller architecture flexibility (in the pre-SDN era), or (ii) independently designed and implemented. In some cases, these extremes in layered architecture can lead to degradations in performance. Given the flexibility and elasticity afforded by SDN, architectures are no longer constrained to these extremes. The optimization framework according to many embodiments of the invention, which allows for network resource allocation and network control to be analyzed and synthesized in a unified framework, is a natural generalization of the NUM framework to incorporate the flexibility of SDN controllers.

Layering as Optimization Decomposition

The LAO/NUM framework is a convex optimization based approach to solving network resource allocation problems. Indeed, many network resource allocation problems can be formulated as the optimization of some utility function subject to constraints imposed by the capacity of the network. The motivation behind the LAO framework is that network structure often leads to decomposability of the resource allocation problem, allowing for distributed (and often iterative) methods to be used that provably converge to a globally optimal network state. Distributed solutions may be necessary in large-scale networks as centralized approaches can often be infeasible, non-scalable, too costly or too fragile. However, as this approach is built around a static optimization problem, it only addresses steady-state performance of the system—in particular, this requires assuming static nominal values for relevant network parameters, and does not allow the designer to explicitly penalize undesirable transient behavior in the system. A focused discussion of applying this methodology to a traffic engineering (TE) problem may be found in the case study discussed below.

Distributed Disturbance Rejection

For all of its favorable properties, the LAO/NUM framework is not naturally robust to fast-time scale disturbances as dynamics are not explicitly incorporated into the problem formulation. In contrast, the distributed disturbance rejection problem assumes that a nominal network state has already been specified (e.g., from the solution to a NUM problem), and aims to maintain the network state at these values despite network dynamics, un-modeled disturbances and information sharing constraints. The appropriate tool for solving the disturbance rejection problem may be distributed optimal control theory, which allows for fast time-scale dynamics and information sharing constraints between local controllers to be explicitly incorporated into the synthesis procedure. A focused review of using distributed optimal control to design an admission controller may be found in the case study presented later in this application.

A Unified Optimization Based Approach

As described, LAO/NUM addresses steady-state network resource allocation problems, whereas the disturbance rejection problem ensures that the system efficiently remains at some nominal state despite fast time-scale fluctuations in the dynamics. These two methods (NUM and disturbance rejection) are often designed independently of each other by appealing to a time-scale separation between the planning and control problems, or are vertically combined in the data plane leading to stabilizing, rather than optimal/robust, distributed controllers. With the introduction of SDN and its explicit separation of the application, control and data planes, it is now possible to have the "planning" of network resource allocation explicitly account for and react to fast time-scale dynamics.

In the optimization framework of many embodiments of the invention, the NUM framework may be extended to explicitly incorporate fast time-scale dynamics. This may be done by extending defining a problem that optimizes a system trajectory with respect to a functional utility, subject to both network dynamics and information sharing constraints. Through a suitable vertical decomposition of the problem, a layered architecture composed of a low-level fast-time scale tracking layer (i.e., a data plane controller) and top-level slow-time scale planning layer (i.e., an application plane layer) naturally emerges. According to some embodiments of the invention, the low-level data plane controller comprises a distributed optimal controller that takes as an input a virtual state trajectory generated by the top-level application plane, where this top-level layer consists of a resource allocation problem that optimizes a weighted sum of a network utility function and a "tracking penalty" regularizer. This latter penalty can be interpreted as a model of the data plane controller's ability to follow the virtual reference trajectory issued by the application plane. This presents an explicit, simple, but exact model of the fast-time scale dynamics incorporated into the network resource allocation problem. The control plane, in a number of embodiments of the invention, is thus tasked with sending state measurements up from the data plane to the application plane to be used by the "planner." as well as transmitting virtual state trajectories down from the application plane to the data plane to be used by the distributed controller to bring the true state of the system to these nominal values. Thus, this framework may be viewed as an organic extension of the NUM framework to incorporate the additional flexibility and elasticity afforded to the network controller by the SDN framework. The optimization framework of several embodiments of the invention may be as scalable as the underlying optimization and control techniques used in its realization.

The next section discusses how this extension of the LAO/NUM frameworks, according to several embodiments of the invention, can be used to explore the Hybrid SDN design space related to a joint TE/AC problem.

A Joint TE/AC Problem

In this section, a joint TE/AC problem is formulated, and three different layered architectures defined for solving it. The first is a "traditional" architecture (TA) as in FIG. 6A, in which the TE problem is updated at a slow time-scale using nominal models of user traffic demands, and the resulting nominal flows are then tracked using an AC. The second is an "extreme" SDN (xSDN) architecture as in FIG. 6C, in which the joint TE/AC problem is tackled using a model predictive control (MPC) approach. This architecture may be referred to as an "extreme" SDN architecture because the network resource allocation TE problem and the disturbance rejection AC problem are jointly solved in the application plane. This xSDN approach may be particularly useful in smaller scale settings. Finally, the third architecture proposed is a Hybrid SDN (HySDN) architecture as in FIG. 6B: by applying the optimization framework according to several embodiments of the invention, a modified TE problem (that incorporates a suitable tracking penalty) may be solved in the application plane using MPC, and the resulting virtual state trajectories may then be transmitted to and tracked by an AC embedded in the data plane.

In the following paragraphs, the communication and computation delays needed to implement each of these architectures are explicitly modeled. The TE and AC problems are first described and then used to define a joint TE/AC problem. These problems are then used to define the three architectures to be studied, namely the TA, xSDN and HySDN architectures.

Traffic Engineering

Under the quasi-static model, the traffic engineering problem can be cast as a Multi-Commodity Flow (MCF) problem. Consider a wireline network as a directed graph $G=(\mathcal{V}, \mathbb{E})$, where $\mathcal{V}$ is the set of nodes, $\mathbb{E}$ is the set of links, and link (u,v) has capacity $c_{u,v}$. The offered traffic is represented by a traffic matrix $D_{s,d}$ for source-destination pairs indexed by (s,d). The load $f_{u,v}$ on each link (u,v) depends on how the network decides to route the traffic. TE usually considers a link-cost function $\phi(f_{u,v}, c_{u,v})$ that is an increasing function of $f_{u,v}$. Here, the restriction $\phi(f_{u,v}, c_{u,v}) = f_{u,v}/c_{u,v}$ is applied and the global objective defined as $\Phi(\{f_{u,v}, c_{u,v}\}) = \max_{u,v \in \mathbb{E}} \phi(f_{u,v}, c_{u,v})$, although more general functions could also be used (such as a piecewise linear approximation to the M/M/1 delay formula).

In order to determine the optimal flows that should be assigned to the links of the network, the following multi-commodity flow problem is solved:

$$\min_{\{f_{u,v}^{(s,d)}\}} \Phi(\{f_{u,v}, c_{u,v}\}) \quad \text{(MCF)}$$

$$\text{s.t.} \sum_{v:(s,v) \in \mathbb{E}} f_{s,v}^{(s,d)} - \sum_{u:(u,s) \in \mathbb{E}} f_{u,s}^{(s,d)} = D_{s,d} \,\forall\, s \neq d$$

$$f_{u,v} := \sum_{(s,d)} f_{u,v}^{(s,d)} \leq c_{u,v} \,\forall\, (u, v) \in \mathbb{E}$$

$$f_{u,v}^{(s,d)} \geq 0,$$

where $f_{u,v}^{(s,d)}$ corresponds to the flow on link (u,v) from source s to destination d. Traditionally the MCF problem is formulated in terms of commodities labeled by their destination d only (i.e., $f_{u,v}^d$). This slightly non-standard formulation is adopted here in order to facilitate integration with the AC problem posed and solved in the SOSR paper. Leveraging the LAO approach, many distributed solutions (with varying degrees of implementation complexity and global optimality) have been developed. However, for the purposes of the case study considered later in the present application, it is assumed that the TE problem is small enough to be solved by a centralized decision maker.

Admission Control

The admission control task defined in the SOSR paper is described as follows: given a set of source-destination pairs (s,d), a set of desired flow rates $f_{(u,v)}^{(s,d),*}$ on each link (u,v) for said source-destination pairs, and a fixed routing strategy that achieves these flow rates under nominal operating conditions, design an admission control policy that maintains the link flow rates $f_{(u,v)}^{(s,d)}(t)$ as close as possible to $f_{(u,v)}^{(s,d),*}$ while minimizing the amount of data stored in each of the admission control buffers, despite fluctuations in the source rates $x_s(t)$. In N. Matni, A. Tang, and J. C. Doyle, "Technical report: A case study in network architecture tradeoffs." Technical Report, 2015 (the relevant disclosure from which is hereby incorporated by reference in its entirety), it was shown that a fluid model of network traffic can be used to write the network dynamics as $$f(t+1)=Rf(t)+Sa(t)$$

$$A(t+1)=A(t)+\tau(M_1 x(t)+M_2 f(t)-a(t)) \quad (18)$$

where f, A, a and x are stacked vectors of the flow rates, admission control buffers, admission control released flow rates, and source rates, respectively, and τ is the discrete-time sampling rate. The matrices R, S, $M_1$ and $M_2$ are uniquely specified by the network topology (assumed to be static for simplicity) and ensure that flow is conserved. For a horizon N, the objective may be to compute admission controllers that minimize a performance metric of the form $$\sum_{t=1}^{N} \sum_{(u,v),(s,d)} \left( f_{(u,v)}^{(s,d)}(t) - f_{(u,v),*}^{(s,d)} \right)^2 + \lambda \|A(t)\|_2^2, \quad (19)$$

subject to the dynamics (18) and the information sharing constraints imposed on the controller. Thus the controllers may aim to minimize a weighted sum of flow rate deviations and admission queue lengths over time, where λ>0 determines the relative weighting assigned to each of these two terms in the final cost. Other cost functions (such as but not limited to those described in the sections above) may also be utilized.

The Joint TE/AC Problem

According to some embodiments of the invention, the TE problem (MCF) is modified to incorporate the system dynamics (18), setting $x_s(t)=D_{s,d}(t)+w_s(t)$, for $w_s(t)$ some fast-time scale fluctuations around the nominal source rate $D_{s,d}(t)$. The following dynamic extension to (MCF) is proposed:

$$\min_{\{f_{u,v}^{(s,d)}\}} \max_t \Phi(\{f_{u,v}, c_{u,v}\}) + \lambda \Psi(A) \quad \text{(Dyn. MCF)}$$

$$\text{s.t. } D_{s,d}(t) \leq \sum_{v:(s,v) \in \mathbb{E}} f_{s,v}^{(s,d)}(t+1) - \sum_{u:(u,s) \in \mathbb{E}} f_{u,s}^{(s,d)}(t+1) \leq$$

$$D_{s,d}(t) + \frac{A_{s,v}^{(s,d)}(t)}{\tau}$$

$$\forall s \neq d$$

$$f_{u,v}(t) := \sum_{(s,d)} f_{u,v}^{(s,d)}(t) \leq c_{u,v}(t) \forall (u,v) \in \mathbb{E}$$

$$f_{u,v}^{(s,d)}(t) \geq 0.$$

dynamics (18)

initial conditions $f(0), A(0)$.

There are two components of note in the dynamic TE problem (Dyn. MCF). The first is the addition of the penalty λΨ(A) on the buffer terms A (here A denotes A(1), ..., A(N), and each A(t) is a stacked vector of the buffers $A_v^{(s,d)}(t)$). This penalty, which should be chosen to be increasing in A and convex, ensures that all deviations in flow are not simply stored in the admission control buffers. The second element of note is the modification of the first set of constraints. This constraint now lower bounds the throughput to be at least as large as the nominal value $D_{s,d}(t)$, and limits how much outwards flow is possible at the next time-step as a function of the nominal flow and what is contained in the buffer. In this way the nominal flows are expected to be such that they always meet the demands $D_{s,d}(t)$, and do not exceed the system's capacity to increase flows based on stored data in the buffers. Finally, the dynamics are also incorporated by defining the optimization problem over a horizon of t=0, 1, ..., N and constraining the flow and buffer values to obey equation (18).

Extension to Joint Congestion Control and TE/AC

In accordance with certain embodiments of the invention, the Dynamic MCF problem (Dyn. MCF) may be modified to further allow for congestion control to be incorporated. In particular, the objective function $\Phi(\{f_{u,v}(t), c_{u,v}(t)\})$ may be replaced with a suitable utility function (such as an α-fair utility) of the form $-\Sigma_s U_s(D_{s,d})$, and the source rate trajectories $D_{s,d}:=(D_{s,d}(1), ..., D_{s,d}(N))$ may further be optimization variables. This is just one example of a modification that can be made to the Dynamic MCF problem (Dyn. MCF) to increase the functionality and diversity of the resulting method. In many embodiments of the invention, various other static resource allocation problems that naturally arise in the context of networking can be suitably modified to be of a form analogous to that found in (Dyn. MCF).

Three Architectures

The Traditional Architecture

The TA is a "decoupled" layered approach, as illustrated in FIG. 6A. This approach may be considered decoupled because a static TE problem is solved that does not explicitly take into account the underlying network dynamics. Specifically, the TE problem (MCF) is solved in the application plane every T time-steps using nominal values for $D_{s,d}$. This approach then correspondingly updates the desired flow rates $f_{(u,v)}^{(s,d),*}$ tracked by the AC. One expects such an approach to work well if the source rates are well modeled by the static traffic demands $D_{s,d}$ over the update window T.

The xSDN Architecture

The xSDN approach may comprise incorporating optimization problem (Dyn. MCF) into a MPC framework. In particular, at time k, the application plane measures the network state (f(k−e),A(k−e)), where e is the communication delay incurred in measuring the global network state, and uses this network state as the initial condition to solve (Dyn. MCF). It may be assumed that solving this optimization problem takes i time steps. As such, the resulting control sequence a(k−e), ..., a(k−e+N) may only be available at time k+κ. The application plane controller then transmits the sequence a(k+κ), ..., a(k+2κ) to the admission control buffers in the data plane, which then implement this sequence of control actions. The entire process may then be repeated. See FIG. 6C for a diagram of this control architecture.

The HySDN Architecture

Figure 7:
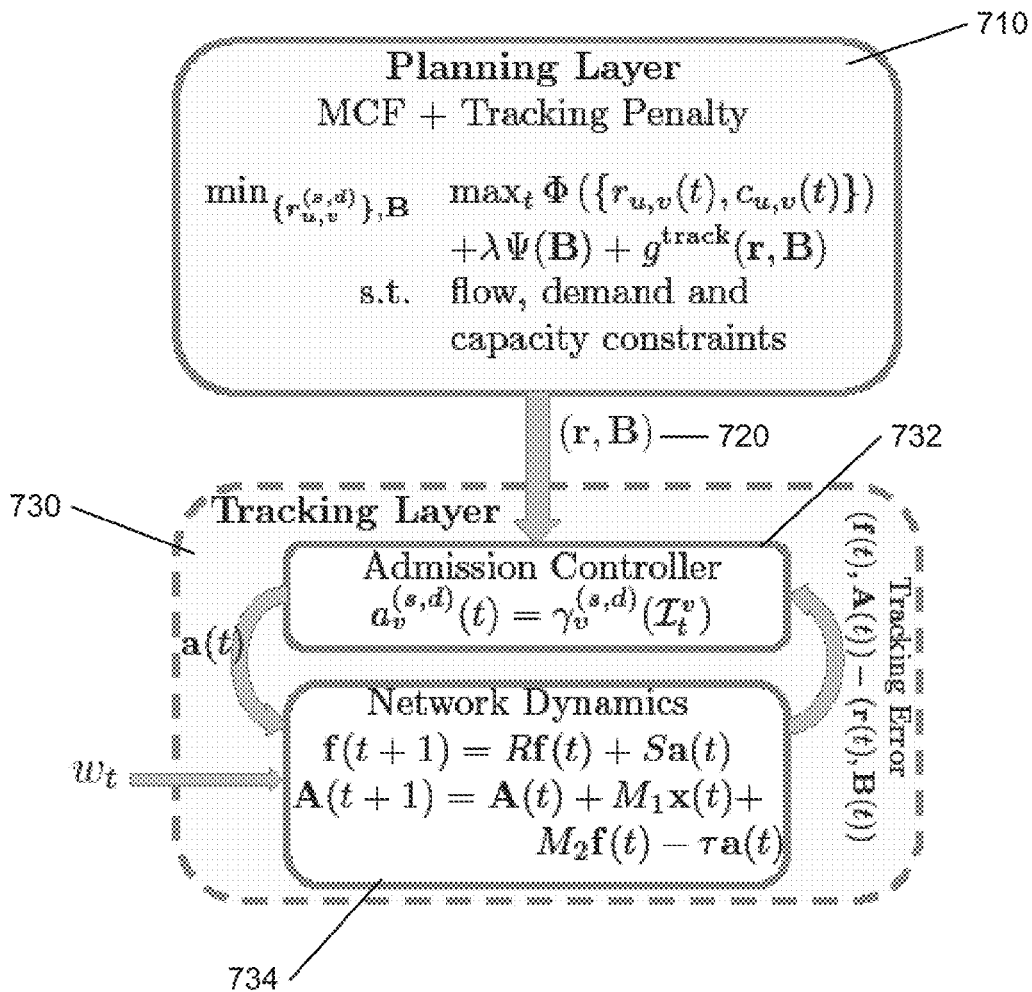
FIG. 7 is a diagram of an HySDN architecture optimization framework in accordance with an embodiment of the invention.

FIG. 7 illustrates an HySDN architecture 700 for joint TE/AC according to a number of embodiments of the invention. For simplicity, r denotes $\{r_{u,v}^{(s,d)}\}$ in the diagram. Architecturally, the HySDN approach may be viewed as an intermediate between the TA and xSDN architectures. Some functionality is included in the application (planning) layer 710, and some is included in the data plane (tracking) layer 730, as represented in FIG. 6B. According to some embodiments of the invention, a model of data plane control capabilities (via a tracking penalty) is included in the application plane 710, thus allowing the HySDN controller to inherit the strengths of both the TA and the xSDN control schemes, i.e., data plane feedback control and responsive dynamic TE.

In particular, the optimization framework of certain embodiments of the invention introduces virtual reference variables $r_{u,v}^{(s,d)}$ and B (where $\{r_{u,v}^{(s,d)}\}$ are the virtual flow rate references for the true flows $\{f_{u,v}^{(s,d)}\}$, and B is the virtual buffer reference for the true buffer values A). The use of these virtual reference variables functionally separates the tasks of planning the optimal flow rates and buffer values and maintaining the network state at these values. In particular, this results in a "planning layer" 710 in the application plane that computes virtual state trajectories (720) $\{r_{u,v}^{(s,d)}\}$ and B, and a "tracking layer' 730' in the data plane that takes these virtual state trajectories 720 as an input and computes control actions a such that $\{r_{u,v}^{(s,d)}\} \approx \{f_{u,v}^{(s,d)}\}$ and B≈A (see FIG. 7). An important feature of this framework is that the fast-time scale tracking-level control policies may be precomputed offline, allowing for real-time implementation of the AC as feedback controllers.

Following is the resulting optimization problem that the planning layer 710 must solve.

$$\min_{\{r_{u,v}^{(s,d)}\},B} \max_t \Phi(\{r_{u,v}(t), c_{u,v}(t)\}) + \lambda \Psi(B) + g^{track}(\{r_{u,v}^{(s,d)}\}, B) \quad \text{(Planning MCF)}$$

$$\text{s.t.} \quad D_{s,d}(t) \le \sum_{v:(s,v)\in E} r_{s,v}^{(s,d)}(t+1) -$$

$$\sum_{u:(u,s)\in E} r_{u,x}^{(s,d)}(t+1) \le D_{s,d}(t) + \frac{B_{s,v}^{(s,d)}(t)}{\tau}$$

$$\forall s \ne d$$

$$r_{u,v}(t) := \sum_{(s,d)} r_{u,v}^{(s,d)}(t) \le c_{u,v}(t) \forall (u, v) \in E$$

$$r_{u,v}^{(s,d)}(t) \ge 0.$$

In many embodiments of the invention, the problem (Planning MCF) may no longer need to solve for the fast-time scale admission control actions a, as these are pre-solved for in the tracking problem, and the dynamic constraints are no longer present. Rather, the objective function may be augmented with an additional penalty function $g^{track}(\{r_{u,v}^{(s,d)}\},B)$ which, as described above with regard to the optimization framework of various embodiments of the invention, captures the tracking layer's ability to guide the true state of the system to the match the reference values ($\{r_{u,v}^{(s,d)}\}$,B). This problem then may only be subject to the simple constraints that are a natural generalization of those present in (MCF). Much as in the xSDN architecture, the planning problem (Planning MCF) may be incorporated into a MPC framework. However, now rather than transmit explicit control actions a(k+κ), . . . , a(k+2κ) down to the tracking layer 730, the application plane 710 may transmit its virtual reference trajectories (720) ($\{r_{u,v}^{(s,d)}\}$,B) to the admission controller 732 in the data plane, which then uses feedback control with network dynamics 734 to bring the state of the system to these nominal values.

In the next section, an example of the joint TE/AC problem is studied and the effects of computational delay on the performance achieved by the different architectures are discussed.

An Illustrative Case Study

Figure 8:
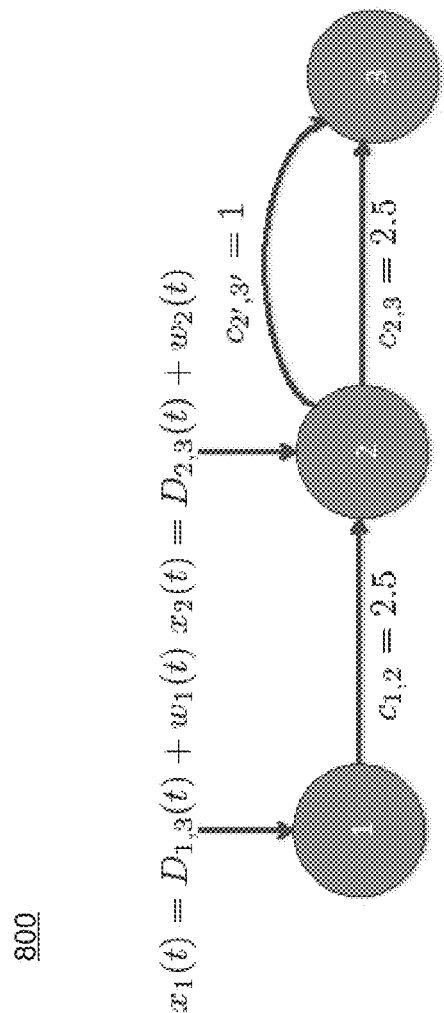
FIG. 8 is a diagram of a network topology in accordance with an embodiment of the invention.

FIG. 8 illustrates a simple network topology 800 for the present case study. It is assumed that there is an admission controller present at nodes 1 and 2. The present case study topology and parameters were chosen to highlight differences in performance amongst the three architectures using a simple and easily visualized system. Because of the simple topology considered, it was necessary to set some parameters at slightly unrealistic values to obtain noticeable gaps in performance between the different architectures. More dramatic differences are expected become apparent for more complex topologies and coordination problems.

TABLE 2

HySDN simulation results

| | κ = 1 | κ = 2 | κ = 3 | κ = 4 |
|---|---|---|---|---|
| Avg. Φ | 0.9049 | 0.9032 | 0.9005 | 0.8997 |
| Avg A₁ | 0.0447 | 0.0587 | 0.0728 | 0.0902 |
| Avg A₂ | 0.0362 | 0.0377 | 0.0427 | 0.0473 |

TABLE 3 xSDN simulation results

| | κ = 1 | κ = 2 | κ = 3 | κ = 4 |
|---|---|---|---|---|
| Avg. Φ | 0.9005 | 0.8983 | 0.8992 | 0.9106 |
| Avg A₁ | 0.0513 | 0.0653 | 0.0785 | 0.1533 |
| Avg A₂ | 0.0477 | 0.0519 | 0.0567 | 0.0604 |

Hence, the sampling time τ was set to be 0.1 s, and the following simplifying assumption was made: the communication delay e was set to 0 (as this delay would be identical across all architectures) and it was assumed that the Globally Optimal Delay free (GOD) AC is implemented by the TA and HySDN architectures (as described in further detail in the SOSR paper). It is emphasized that both of these assumptions were made to highlight the differences in performance caused by different types of vertical layering. This approach can explicitly accommodate both nonzero communication delays and more complex information sharing patterns in the AC, as defined in the SOSR paper. Likewise it was assumed that in the xSDN architecture, the admission control actions a, once computed, could be instantaneously shared and implemented by the AC. This section discusses the effects of increasing the computation delay κ on the performances of the xSDN and HySDN architectures, and compare these two schemes to the TA approach of solving a static TE problem every T time-steps and using an AC to maintain the computed nominal flow rates.

The study considered the following source rates: $x_1(t)=2+w_1(t)$ and $x_2(t)=\text{step}_{25}(t)+w_2(t)$, where the $w_i(t) \sim \mathcal{N}(0.1, 0.01)$ are i.i.d. additive white Gaussian noise (AWGN) with a slight positive bias (mean of 0.1) and small variance ($\sigma^2=0.01$), and $\text{step}_k(t)=0$ for t<k and 1 for t≥k (i.e., $D_{2,3}(t)$ is 0 from times 0 to 24, and then steps to 1 afterwards). The positive bias can be seen as modeling an underestimate of the nominal traffic demands $D_{s,d}(t)$ by the TE layer.

Summarized in Tables 1 and 2 are the average link utilizations (Avg. Φ) and average buffer sizes (Avg. $A_i$) for the HySDN and xSDN architectures as a function of computation delay κ. Those values were computed across ten simulations beginning from initial conditions specified by $A_1^{(1,3)}(0)=0.1$, $f_{1,2}^{(1,3)}(0)=f_{2,3}^{(1,3)}(0)=2$, and all other states set to 0. For each simulation iterate, both architectures were driven by the same noise sequence, thus ensuring a fair comparison. Further representative state trajectories are shown in FIGS. 9A-D for the HySDN and xSDN architectures for computation delay κ=4.

Figure 9B:
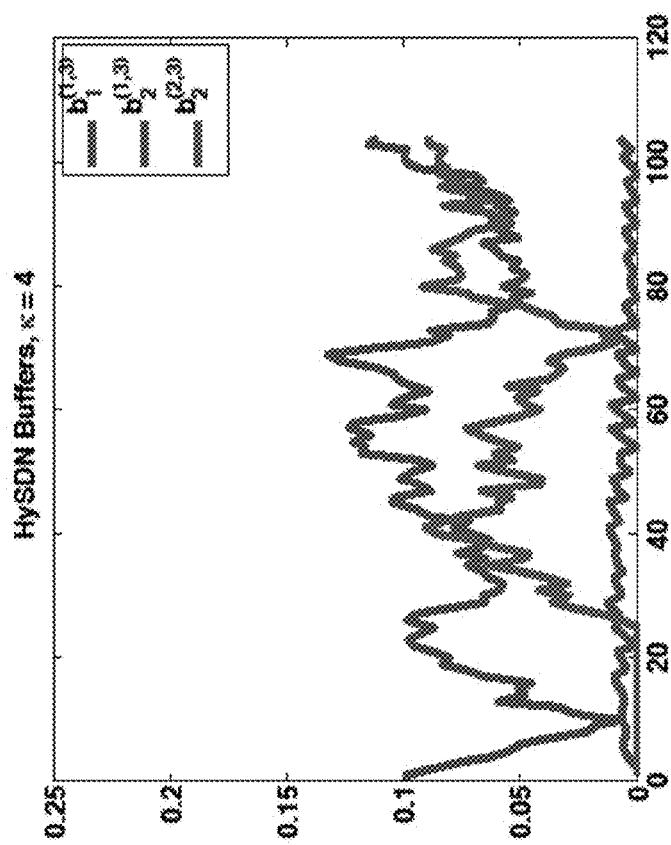
FIGS. 9A-B are diagrams of representative time series plots for an HySDN layered architecture in accordance with an embodiment of the invention.
Figure 9A:
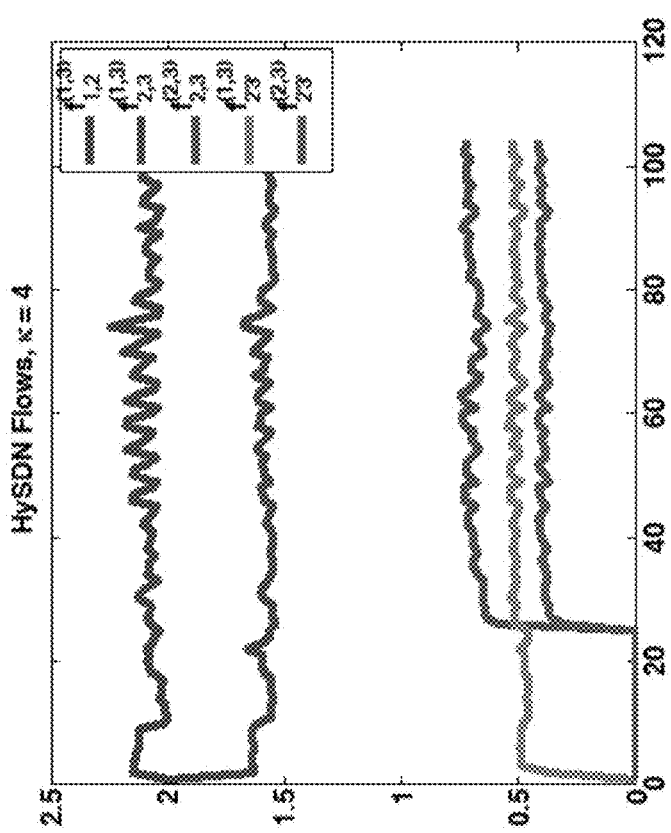
Figure 9D:
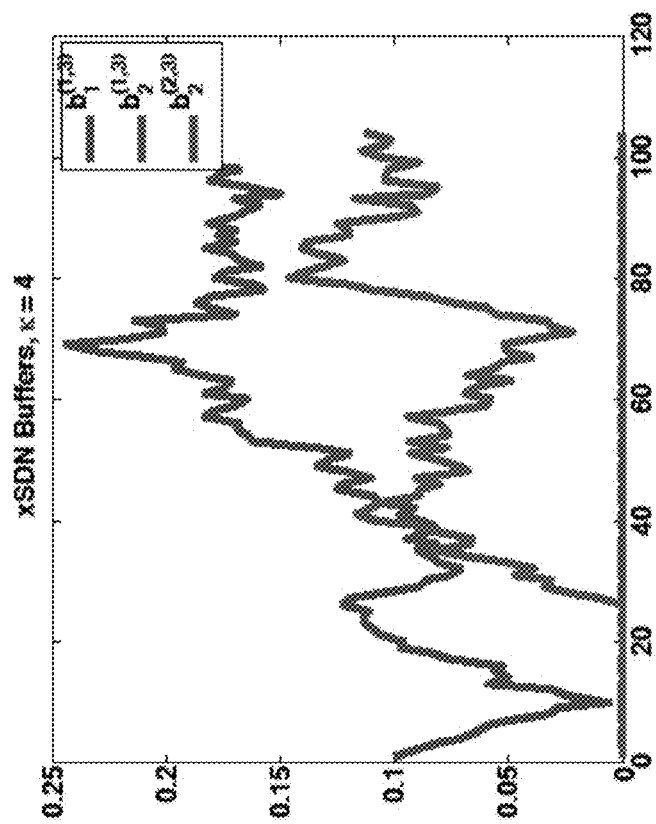
FIGS. 9C-D are diagrams of representative time series plots for an xSDN layered architecture in accordance with an embodiment of the invention.
Figure 9C:
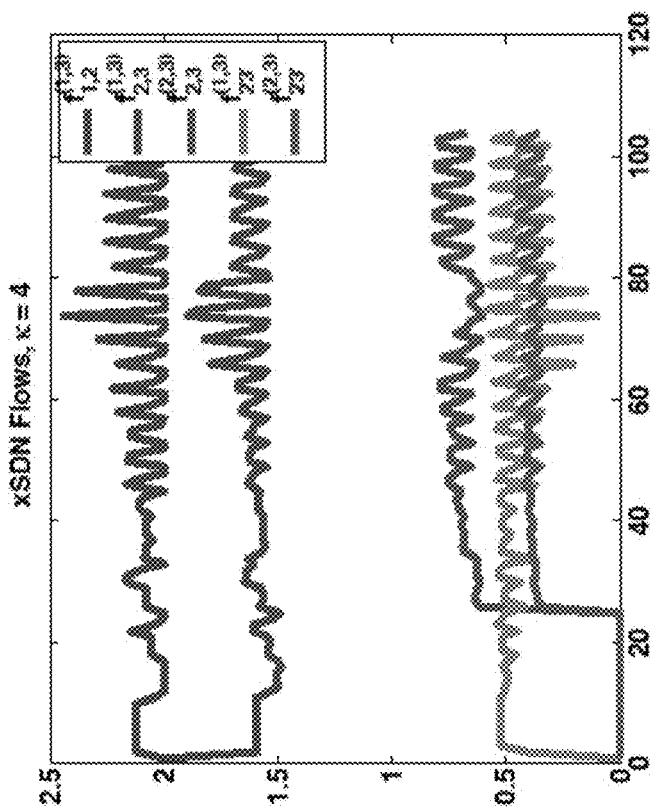
Figure 9F:
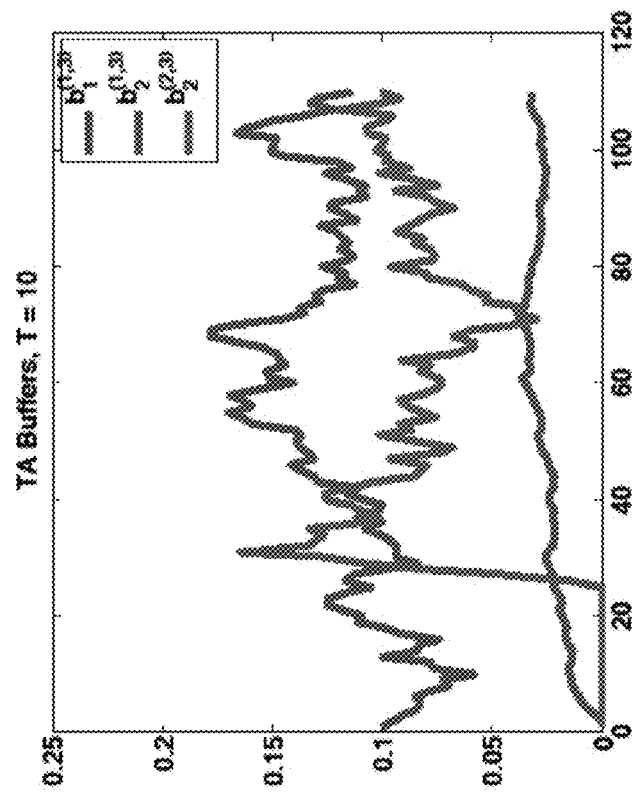
FIGS. 9E-F are diagrams of representative time series plots for a traditional layered architecture in accordance with an embodiment of the invention.
Figure 9E:
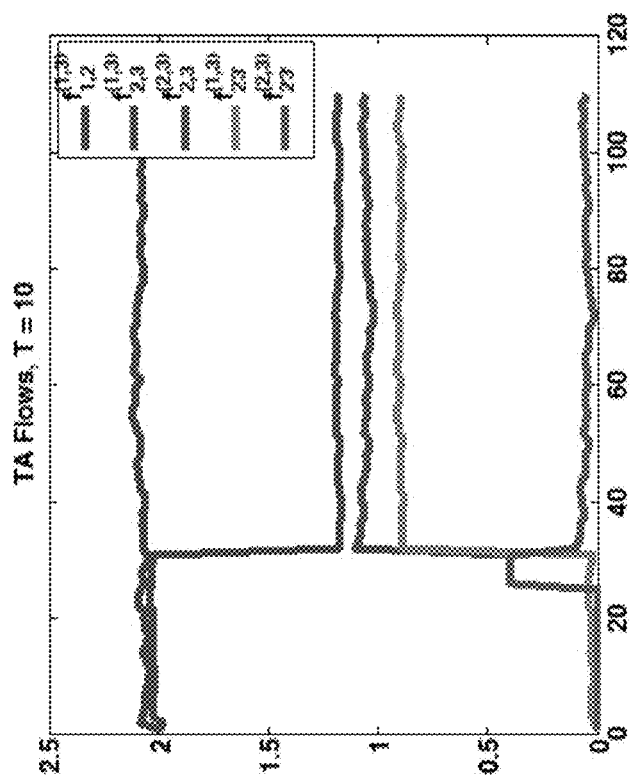

As can be seen, as κ increases, the gap in performance between xSDN and HySDN increases. This is because the HySDN architecture incorporates explicit feedback in the AC layer to compute its control actions, thus providing robustness to computational delay. By contrast, the xSDN control is computed ahead of time and hence applied in "open-loop" in between computation delay limited updates. Finally, representative trajectories are shown for the TA architecture in FIGS. 9E-F. This scheme was investigated for a TE update period T=10. The resulting performance metrics, again computed across 10 simulations, are: Avg.$\Phi$=0.9282, Avg.$A_1$=0.1217, Avg.$A_2$=0.0924. The TA architecture is outperformed by the HySDN architecture for all values of $\kappa$, and has comparable performance to the xSDN architecture only for larger $\kappa$.

Some embodiments of the invention may be applied to other joint planning/control problems in the context of SDN controlled wide area networks and data-centers, and to validate these novel layered control architectures in experimental testbeds. In addition, certain embodiments of the invention may be used in designing elastic architecture control paradigms that jointly exploit SDN and NFV to allow for virtual architectural resources to be allocated and distributed in real-time.

Extensions

Predictive Control at the Planning Layer

The optimization methods according to several embodiments of the invention can be extended to an infinite horizon problem by employing receding horizon control (RHC) or model predictive control (MPC) techniques at the planning layer. The major advantage of this approach over standard MPC techniques, beyond those previously mentioned in terms of more natural incorporations of information sharing constraints, is a computational speed increase. This is a result of the MPC problem only operating in "reference space." That is, it may only need to compute the unconstrained (or more simply constrained) reference trajectory, as opposed to the full state and control action trajectory.

Nonlinear Dynamics

Although the previous discussion focused on linear dynamics, in certain embodiments of the invention, one can replace the dynamics (18) with general nonlinear dynamics $x_{t+1}=f_t(x_t, u_t, w_t)$ and use other techniques to solve the resulting tracking control problems. These include but are not limited to nonlinear optimal control, feedback linearization, linearization and model predictive control (MPC) techniques.

Virtualized Dynamics & Model Reduction

In some approaches according to embodiments of the invention, an "extreme" form of layering may be imposed such that the top layer is static (i.e., is not subject to dynamic constraints), and the bottom layer may be completely pre-solved. According to other embodiments of the invention, a more general approach may be to allow the planning layer to impose virtual dynamics on the reference trajectory row. In this case, the modified tracking problem becomes:

$$\underset{r_{0:N}}{\text{minimize}}\, \mathscr{C}(C_{0:N}\cdot r_{0:N}) + f_\rho^{track}(r_{0:N}) \text{ s.t. } C_{0:N}\cdot r_{0:N} \in \mathcal{R} \quad (20)$$

$$\text{s.t. } r_{t+1} = f_t^{virtual}(r_t),$$

where $f_t^{virtual}(r_t)$ are the virtual dynamics that the planning layer wants impose on the reference trajectory. These virtual dynamics could be user-specified, or they could arise from model-reduction techniques applied to the true physical system, allowing for planning to be performed using a simpler model of the true physical system (with the detrimental effects of this simpler model on performance mitigated by the use of the tracking penalty function $f_\rho^{track}$.)

Recursive Layering

In a number of embodiments of the invention, the use of virtual dynamics at the planning layer offers the possibility of recursively applying the previously described layering techniques by introducing further redundant variables (now constrained to match the virtual dynamics of the planning layer), and applying the relaxation. This may be useful in the context of exploiting time-scale separation, physical decoupling, etc. In particular, this approach may be applied to model and control a large-scale cyber-physical system (such as but not limited to the power-grid) starting at the highest level of abstract planning (e.g. a CEO of a utility company) down to sub-atomic scale, by simply recursively applying the described approach.

Potential Applications

Various embodiments of the invention may be useful in application areas including but not limited to the following.

Software defined and content centric networking: The optimization framework according to many embodiments of the invention allows for the optimal integration of high-level resource allocation and planning (e.g., cache management, routing, traffic engineering, congestion control, etc.) with low-level resource and traffic control (e.g., admission control, cache transfers, etc.). An example of such a problem is discussed above in the present application, in which traffic engineering and admission control are jointly performed using an MPC based embodiment of the framework.

Smart and power grid control: In many ways the power-grid is similar to the internet in terms of its layered architecture and control objectives. Its difference lies in the system's physics and dynamics. Embodiments of the invention may allow for the optimal integration of high-level planning problems (e.g., economic dispatch, optimal power-flow) with low-level control problems (e.g., frequency regulation) in this context.

Robotics: Robotics may be an important application area for the optimization framework according to a number of embodiments of the invention. Indeed robots often comprise extremely complicated physical systems that must operate at a conceptual level, i.e., "in task space," while still having fast reflexive low-level control. One obstacle in applying advanced control techniques to robotics is the need for fast computation at this reflexive level. The approach according to several embodiments of the invention allows for these controllers to be pre-solved for, thus allowing real-time computations to be performed on the virtualized simplified dynamics (or task space), and may allow for order of magnitude speed-ups in performance.

Virtual reality/training simulators: The method according to various embodiments of the invention allows for a principled design of virtual reality/training simulators by allowing for virtual dynamics to be generated by a low-level tracking controller. In particular, this method offers an explicit approach to synthesizing a "virtual dynamics engine." For example, suppose that researchers are designing a flight simulator and want the joystick to simulate the feedback from different types of aircraft (e.g., Cessna, Boeing 747. F16). In certain embodiments of the invention, given suitable actuation and degrees of freedom in the joystick, the planning layer, by only changing its cost function $\mathscr{C}(\cdot)$ and virtual dynamics $f_t^{virtual}$, may make the joystick mimic each of these. This simple example is illustrative of a broader point. In some embodiments of the invention, this approach may be useful in the context of networking as well. For example, it may be applied to an admission control scheme to make users' flows into the network match the model used during the design phase. In the context of power-grid control, this scheme may make renewable energy resources behave like synchronous machines, thus imposing an artificial frequency coupling between these inherently unstable devices and the grid.

CONCLUSION

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data network configured to connect computers to enable transmission of data between a plurality of computers, comprising:
a switch configured to send data based on an instruction;
a data link configured to transfer data from the switch to another switch within the data network;
a tracking processor in communication with the switch; and
a planning processor in communication with the tracking processor, wherein the planning processor is independent from the tracking processor, and
wherein the planning processor is configured to generate a reference trajectory by:
receiving a local system state with respect to utilization of network resources from the tracking processor;
calculating the reference trajectory by solving a planning problem, wherein the planning problem includes a resource allocation problem that optimizes a weighted sum of a network utility function and a tracking penalty function, wherein the tracking penalty function models the tracking processor's ability to guide an actual trajectory to match the reference trajectory, and wherein the reference trajectory defines a desired path of change over time in the local system state and indicates an optimal trajectory for transmission of data between the plurality of computers; and
sending the reference trajectory to the tracking processor; and
wherein the tracking processor is configured to track the reference trajectory by:
determining a set of states of the switch over a time interval;
sending a local system state to the planning processor, the local system state including a subset of the set of states of the switch;
receiving the reference trajectory from the planning processor;
computing a control action by solving a tracking problem based on the reference trajectory, wherein the control action is computed so that implementation of the control action in managing transmission of data between the plurality of computers achieves a change in the local system state resulting in the actual trajectory, wherein the actual trajectory approximates the reference trajectory;
determining the instruction based on the control action, wherein the instruction indicates one of the plurality of computers to which a data packet is to be transmitted; and
sending the instruction from the tracking processor to the switch.

2. The data network of claim 1, further comprising:
a set of buffers within the switch, wherein the set of buffers includes buffer capacities for storing data, the reference trajectory includes a target data flow rate and a target buffer utilization, and the control action is computed based on the buffer capacities, the target data transfer rate and the target buffer utilization.

3. The data network of claim 2, wherein the actual trajectory includes an actual data flow rate and an actual buffer utilization, and execution of the instruction by the switch results in data being handled by the set of buffers such that the actual data transfer rate approximates the target data transfer rate and the actual buffer utilization approximates the target buffer utilization.

4. The data network of claim 1, wherein the network utility function optimizes data flows assigned to the data link based on a link capacity and a cost function.

5. The data network of claim 1, wherein the tracking penalty function is configured to restrict storage of data in a set of buffers.

6. The data network of claim 1, wherein the planning problem is based on a minimum data flow.

7. The data network of claim 1, wherein the planning problem is solved using model predictive control (MPC).

8. The data network of claim 1, wherein the tracking problem includes a distributed optimal control problem.

9. The data network of claim 1, wherein the tracking processor uses feedback control to track the reference trajectory.

10. The data network of claim 1, wherein the tracking processor is capable of tracking the reference trajectory given network dynamics, control costs, information sharing constraints, and system noise.

11. A computing system for optimizing a data network, comprising:
a planning processor in communication with a tracking processor, the tracking processor being in communication with a switch of a data network, wherein the planning processor is independent from the tracking processor;
a memory connected to the planning processor and configured to store a planning program, wherein the planning program configures the planning processor to generate a reference trajectory for data transfer from the switch via a data link within the data network by:
receiving a local system state with respect to utilization of network resources from the tracking processor, the local system state including a state of the switch;
calculating the reference trajectory by solving a planning problem, wherein the planning problem includes a resource allocation problem that optimizes a weighted sum of a network utility function and a tracking penalty function, wherein the tracking penalty function models the tracking processor's ability to guide an actual trajectory to match the reference trajectory, and wherein the reference trajectory defines a desired path of change over time in the local system state and indicates an optimal trajectory for transmission of data within the data network; and sending the reference trajectory to the tracking processor;
wherein the tracking processor is configured to track the reference trajectory by managing data transfer from the switch.

12. The computing system of claim 11, wherein the reference trajectory includes a target data flow rate and a target buffer utilization.

13. The computing system of claim 11, wherein the tracking penalty function is configured to restrict storage of data in a set of buffers.

14. A data network node, comprising:
a switch configured to communicate with a second device within a data network, and to communicate with a tracking processor, the tracking processor being in communication with a planning processor, wherein the planning processor is independent from the tracking processor, and the switch being configured to send data via a data link to the second device based on an instruction from the tracking processor;
a memory connected to the tracking processor and configured to store a tracking program, wherein the tracking program configures the tracking processor to track a reference trajectory from the planning processor by:
determining a set of states of the switch over a time interval;
sending a local system state to the planning processor, the local system state including a subset of the set of states of the switch;
receiving the reference trajectory from the planning processor, wherein the reference trajectory is calculated by solving a planning problem, wherein the planning problem includes a resource allocation problem that optimizes a weighted sum of a network utility function and a tracking penalty function, wherein the tracking penalty function models the tracking processor's ability to guide an actual trajectory to match the reference trajectory, and wherein the reference trajectory defines a desired path of change over time in the local system state and indicates an optimal trajectory for transmission of data within the data network;
computing a control action by solving a tracking problem based on the reference trajectory, wherein the control action is computed so that implementation of the control action in managing transmission of data within the data network achieves a change in the local system state resulting in the actual trajectory, wherein the actual trajectory approximates the reference trajectory;
determining the instruction based on the control action, wherein the instruction indicates one of a plurality of computers to which a data packet is to be transmitted; and
sending the instruction from the tracking processor to the switch.

15. The data network node of claim 14, further comprising:
a set of buffers within the switch, wherein the set of buffers includes buffer capacities for storing data, the reference trajectory includes a target data flow rate and a target buffer utilization, and the control action is computed based on the buffer capacities, the target data transfer rate and the target buffer utilization.

16. The data network node of claim 15, wherein the actual trajectory includes an actual data flow rate and an actual buffer utilization, and execution of the instruction by the switch results in data being handled by the set of buffers such that the actual data transfer rate approximates the target data transfer rate and the actual buffer utilization approximates the target buffer utilization.

* * * * *